United States Patent
Avni et al.

(10) Patent No.: US 6,687,390 B2
(45) Date of Patent: Feb. 3, 2004

(54) SYSTEM FOR AND METHOD OF WEB SIGNATURE RECOGNITION SYSTEM BASED ON OBJECT MAP

(75) Inventors: Yossi Avni, Herzelya (IL); Eytan Suchard, Kyriut Byalik (IL)

(73) Assignee: Applied Neural Conputing Ltd., Herzelya (IL)

( * ) Notice: Subject to any disclaimer, the term of this patent is extended or adjusted under 35 U.S.C. 154(b) by 227 days.

(21) Appl. No.: 10/000,796

(22) Filed: Dec. 4, 2001

(65) Prior Publication Data

US 2003/0103653 A1 Jun. 5, 2003

(51) Int. Cl.[7] ................................................ G06K 9/00
(52) U.S. Cl. ........................ 382/119; 382/115; 345/741
(58) Field of Search ................................ 382/115, 119, 382/116; 345/163, 164, 167, 741, 742, 743, 748, 749; 705/75, 76, 77, 78, 79, 70; 713/176, 178, 179, 200, 201, 180, 186; 709/206, 219, 321, 328, 203, 217, 313

(56) References Cited

U.S. PATENT DOCUMENTS

| | | | |
|---|---|---|---|
| 5,553,156 A | | 9/1996 | Obata et al. |
| 5,825,906 A | | 10/1998 | Obata et al. |
| 5,828,772 A | | 10/1998 | Kashi et al. |
| 5,838,812 A | * | 11/1998 | Pare et al. .................. 382/115 |
| 6,157,731 A | | 12/2000 | Hu et al. |
| 6,163,616 A | | 12/2000 | Feldman |
| 6,381,344 B1 | * | 4/2002 | Smithies et al. ............ 382/115 |

* cited by examiner

*Primary Examiner*—Bhavesh M. Mehta
*Assistant Examiner*—Ali Bayat
(74) *Attorney, Agent, or Firm*—Fulbright & Jaworski L.L.P.

(57) ABSTRACT

The present invention includes a system and a method of validating an identity of a user using a pointing device by comparing a sampled mouse signature with an authenticated mouse signature. The method includes presenting a virtual pad including a background graphic image, a plurality of objects positioned on the background graphic image to a user. The user moves the pointing device to manipulate a cursor on the background graphic image. The method includes a step of sampling a plurality of events corresponding to positions of the cursor to provide a sampled mouse signature including a set of position vectors. The present invention includes comparing the sampled mouse signature to a stored mouse signature representing the identity of a user, and validating the identity of a user in response to the comparing step.

48 Claims, 20 Drawing Sheets

```
int TRAILER_calculate_trailer(int ct_x[],
                              int ct_y[],
                              int ct_t[],
                              int ct_length,
                              int *ct_a,
                              int *ct_b)
{ int i;

int ct_idx1=TRIALER_INIT_INDEX1,ct_idx2=TRIALER_INIT_INDEX2,
      ct_idx3=TRIALER_INIT_INDEX3,ct_idx4=TRIALER_INIT_INDEX4;

int ct_idx5=TRIALER_INIT_INDEX5,ct_idx6= TRIALER_INIT_INDEX6,
      ct_idx7=TRIALER_INIT_INDEX7,ct_idx8=TRIALER_INIT_INDEX8;

int ct_sum1=0,ct_sum2=0,ct_sum3=0,ct_sum4=0;

int ct_prime[N]=
  { TRAILER_PRIME_11, TRAILER_PRIME_12, ..., TRAILER_PRIME_1N
  };

int ct_prime1[N1]=
  { TRAILER_PRIME_21, TRAILER_PRIME_22, ..., TRAILER_PRIME_2N1
  };

if (!ct_x || !ct_y || !ct_t ||
      ct_length<40 || !ct_a || !ct_b) return 0;

for(i=0;i<ct_length;++i)
  {
    // Second and third order sums.
    ct_sum1+=ct_prime[ct_idx1]*ct_prime1[ct_idx5];
    ct_sum2+=ct_prime[ct_idx2]*ct_prime1[ct_idx6];
    ct_sum3+=ct_prime[ct_idx3]*ct_prime1[ct_idx7];
    ct_sum4+=
    ct_prime[ct_idx6]* ct_prime[ct_idx4]*ct_prime1[ct_idx8]*
ct_x[i]*ct_y[i]*ct_t[i];

} return 1;
}
```

Calculate the number of times that the curvature changes sign

If $X_i, Y_i$ is the curve

The sign is taken from $\Delta X_i = X_i - X_{i-1}, \quad \Delta Y_i = Y_i - Y_{i-1}$ $\Delta X_{i+1} = X_{i+1} - X_i, \quad \Delta Y_{i+1} = Y_{i+1} - Y_i$ $Val = \#(sgn(\Delta X_i \, \Delta Y_{i+1} - \Delta Y_i \, \Delta X_{i+1}))$ sgn is either 1 or –1 or 0. The value is calculated as the number of times that sgn changes from 1 to –1 or from –1 to 1.

502

$$\text{Calculate Average} = \frac{Sum}{n} \quad Sum = \sum_{k=1}^{n} Val_k$$

$$\text{Calculate Variance} = Ssum \quad Ssum = \sum_{k=1}^{n} Val_k^2$$

503

Calculate deviation $$Dev = \frac{(Val - Average)^2}{s + Variance} \quad s = 0.0001$$

If Dev>9 then fail

Search for sequences of the "c" coordinate that are 0011, enumerate occurrences.

(1) x, y, t, o (2) x, y, t, o (3) x, y, t, 1 → $x_3, y_3, t_3$ (4) x, y, t, 1

602

Calculate average, $\text{Average}_i = \dfrac{sum_i}{n}$  (for both $\text{Sum}_i.X$, $\text{Sum}_i.Y$)

$\text{Sum}_i.X = \sum_{k=1}^{n} X_i$ , $\text{Sum}_i.Y = \sum_{k=1}^{n} Y_i$  such that $X_i$, $Y_i$ are the coordinates of the clicks.

Calculate variance$_i$, $\text{Variance}_i = \dfrac{Ssum_i}{n}$  (n = the number of learned signatures)

603

Calculate deviations $\text{Dev}_i.X = \dfrac{(x_i - average_i.X)^2}{s + Variance_i.X}$  (s is 0.0001)

$\text{Dev}_i.Y = \dfrac{(y_i - Average_i.Y)^2}{s + Variance_i.Y}$

604

If the number of clicks is wrong or $\text{Dev}_i X > 9$ or $\text{Dev}_i Y > 9$ then fail

Figure 6

Sample 3 with Agents or Nodes
Located Every n (10) Samples

Agents or Nodes
From Sample 3

Form Geometric Characteristic Vector:

$$Val_i = \frac{[L_{i+1} - L_i] - [L_i - L_{i-1}]}{ArcLength\ [L_{i+1} \rightarrow L_{i-1}]}$$

Store n-2 Geometric Characteristic Vectors in User
Profile Database as a User Authenticated Signature Profile Sampled Signature with
Nodes or Agents As Stored FCM to Migrate Nodes Toward Curve Nodes Located on Curve by FCM Form Geometric Characteristic Vector:

$$Val_i = \frac{[L_{i+1} - L_i] - [L_i - L_{i-1}]}{ArcLength\,[L_{i+1} \to L_{i-1}]}$$

Store n-2 Geometric Characteristic Vectors in User
Profile Database as a User Authenticated Signature Profile

SYSTEM FOR AND METHOD OF WEB SIGNATURE RECOGNITION SYSTEM BASED ON OBJECT MAP

TECHNICAL FIELD

The present invention relates to methods and apparatus for remotely verifying the identity of a person, such as over an intranet, internet or for similar circumstances in which the identity of an individual must be verified.

BACKGROUND

There are many methods and techniques used to verify the identity of a person during a face-to-face transaction. One method is to compare the person's facial characteristics with an authenticated picture on a validated document. For instance, many businesses require the identity of a patron presenting a check to by validated by a driver's license which includes a photograph of the individual. Similarly, passports and identification cards issued by state or federal agencies are used for verification of the identity of the individual.

Another popular method of verifying the identity of an individual during a face-to-face transaction is through written signature comparison. Many of the previously mentioned documents such as driver's licenses, passports and identification cards also include a written signature of the holder. By comparing the signature on these identifying documents with a written signature signed in the authenticator's presence, the identity of the person may be verified as represented by the document. Other methods of verifying a person's identity are through other biometrics such as fingerprints, distinctive patterns in the retina of the eye, identifying characteristics of hands, and the manner in which an individual grasps a writing instrument. Each of these methods requires specialized hardware or that the authenticator possesses specialized knowledge. While each of these methods can be used to authenticate the identity of a person for a face-to-face transaction, other methods are required to verify a person's identity for remote transactions. Remote transactions for this purpose are defined to be those transactions in which the individuals conducting the transactions are not face-to-face. Examples of remote transactions include transactions over the telephone, computer transactions over an internet or intranet, and similar transactions.

Authentication of an individual in remote transactions typically relies on information purportedly unknown to anyone besides the individual whose identity is being authenticated, e.g., a secret. Information used to authenticate the identity of an individual may include the maiden name of the mother of the individual, social security number, address, zip code, account information such as an AMERICAN EXPRESS®, MASTERCARD®, or VISA®, home telephone number, or unique personal identification number (PIN). With the advent of the Internet and the information available over the Internet, many of these previously acceptable methods of identification are becoming obsolete. Once public information such as the maiden name of the mother of the individual, social security numbers, addresses, zip codes, telephone numbers, and similar information may be accessed over the Internet, this information can no longer be used to verify the identity of an individual.

Two methods of determining an individual's identity without relying on the use of publicly available information for remote transactions include electronic signatures and PINs. For instance, if an individual wanted to access their bank account information via the Internet, the bank may require an electronic signature be sent to the bank to be used to authenticate the identity of the person performing the transaction. Heretofore signatures for remote transactions required specialized hardware on the computer system at which the user performs the transaction; i.e., attempts by users to provide repeatable signature using a mouse or similar pointing device have been unsuccessful. Instead, an electronic pen and a tablet or similar specialized hardware have seen required at the computer terminal being used for the transaction by the individual. Even this method of verification of the identity of a user is not foolproof because electronic signatures may be stored and sent when requested by an individual trying to impersonate another individual. The storage of the electronic signature may be performed on the computer used by the individual for the transaction or by other machines or computers which intercept the electronic signature as it is communicated from the user to, in this example, the bank or other financial institution.

Validating the identity of an individual by using PINs suffer similar drawbacks. When individuals choose personal identification numbers they typically use small number of predictable numbers correspondence to, for example, their birth date, portions of their Social Security number, a loved one's birth date, an anniversary date, a date of a significant event to that individual, or some other easily remembered number. While the selection of these numbers or groups of numbers allow the individual to recall the PIN easily, the association of the numbers with the individual reduces the associated security. Many systems requiring authentication attempt to minimize access by impersonators by limiting the number of attempts accepted from an individual. Many automatic teller machines (ATM) are programmed to confiscate bank cards after three attempts to access the information with incorrect PINs have been attempted. Additional problems with PINs are present when PINs are retained in computer systems. Electronically transmitted PINs may also be obtained by unauthorized individuals and used for later access attempts.

For many transaction over an internet or intranet authenticating an individual's identity is also important. Examples of instances in which the identity of an individual should be authenticated include online banking, purchases via the Internet or an intranet, access to non-public databases or information, access to medical records, remote access to computer systems, e-commerce, e-banking, business-to-business (B2B) transactions, business-to-consumer (B2C) transactions, e-learning, e-training and similar circumstances. In an effort to minimize the amount of hardware require at the computer system used by the individual to access the secured information, many of these sites required the individual being authenticated to enter a PIN as their access code.

One method to alleviate concerns with PINs includes the generation of a random number for the PIN used to authenticate the individual. Random numbers assigned to individuals create other problems in that individuals typically have a difficult time remembering these random PINs. To allow access to these protected systems these individuals may write these PINs down, and store them in their daily planners, on their calendars, in their wallets or purses, or similar locations. By writing these randomly generated PINs down the security of the overall system may be compromised and another individual may gain access to these protected systems by obtaining the recorded PINs.

With increasing computer power, methods incorporating electronic signature or digital signature recognition and authentication systems have been advanced. Such systems typically include an input device such as a digitizing pad or tablet to capture and digitally sample the written signature image and/or a biometric feature of the written signature in various ways to compare the new signature to a previously-stored "authentic" exemplar signature. Currently, written signature authentication solutions fail to provide an effective and particularly reliable signature authentication/verification system which may be readily commercially implemented. Furthermore, with the increasing use of the Internet for a myriad of applications and transactions, accurately and reliably verifying a signature on-line is particularly desirable.

SUMMARY OF THE INVENTION

An object of the present invention is to provide a system and method of validating the identity of a user over an intranet or the Internet which does not require specialized hardware at the computer system used by the individual whose identity is to be validated.

A further object of the present invention is to provide a method and apparatus that preferably employs a simple method of creating a user unique, i.e., signature using a pointing device, such as a mouse and a Virtual Pad at an End-User/Remote User PC (Personal Computer).

The invention is directed to a system and method of authenticating a user by sensing information about the user (biometrics) and eliciting information from the user (a secret). While applicable to the e-commerce environment, the invention is equally usable in a wide range of applications wherein a manually manipulated pointer device such as a computer mouse is available. Using the pointer or pointing device (hereinafter, "PD"), the user draws lines and drags (repositions) and/or clicks on icons positioned on a background image to create a user PD signature. The combination of lines, icon repositioning and specifically placed and timed series of clicks are used to identify the user by comparison with a stored PD signature. In addition to the "secret" information representing the series of actions using the PD, biometric data is also extracted. The biometric data includes, for example, PD manipulation kinetics (e.g., positioning speed, acceleration, shake, etc.), user click duration, etc. Other biometrics may be added including, for example, a thumbprint reader integral to the PD. Preferably, user profile information, including user identification information, is stored in an encrypted format to protect such information from unauthorized access and disclosure.

The invention may use a variety of methods to learn, store and update PD signature profile information to authenticate a user. A preferred method periodically stores sampled PD positional information as vectors including a pair of position coordinate values (e.g., "x" and "y" values), a sample time ("t") and a PD mode. The PD mode may be in the form of a numeric code representing such conditions as, for example, a normal mode (e.g., no button depressed), a click mode (e.g., a left mouse or equivalent button depressed), and a "drag and drop mode" (identifying a particular draggable icon has been captured in response to a mouse click). This stored sampled PD positional information may also be updated with information contained in later authenticated PD signatures.

Analysis of the vectors may include identification of nodes or "agents" at predetermined distances along a signature trail of a sampled signature to be learned. Once initially identified and located, the agents are repositioned using an energy or cost minimization technique such as Adaptive Resonance Theory-Fuzzy Cluster Means (ART-FCM.) The repositioned agents then form the starting point for future signature analysis. Thus, in a verification mode, the geometry of the agents of a signature under examination after agent energy or cost minimization is compared with the geometry of the agents for the learned or authenticated exemplar PD signature, the comparison being indicative of a degree of similarity between the two PD signatures. The degree of similarity may be represented by some standard metric, such as a sum of squares of the deviations between geometry parameters. Of course, other matching techniques may be used including, for example, wavelet analysis of the PD signature.

Use of the invention in the context of e-commerce is particularly advantageous to authenticate a purchaser in an open network environment. For example, the identity of a purchaser may be verified by redirecting a web client from a vendor's web site to a PD signature server. The server identifies the user (this information being automatically sent by the vendor web site or provided by the client machine) and downloads to the client a predefined virtual pad consisting of a background image and prepositioned draggable (and/or fixed) icons. The prospective purchaser uses a pointing device, such as a standard computer mouse, to draw one or more lines, and click on and/or drag icons to predetermined positions on the background. The series of actions are captured as the vectors including mouse x and y coordinates (with reference to the background image), time and PD (or mouse) mode. The server uses the vectors (together with other global information and security checks) to verify the purchaser's identity and send a corresponding message to the e-commerce web site so as to authorize (or deny) some action such as a purchase.

BRIEF DESCRIPTION OF THE DRAWINGS

The above and other objects, features and advantages of the present invention will become apparent from the following detailed description which is to be read in conjunction with the accompanying drawings in which:

FIG. 2 is a sample C++ program which may be used to calculate a simple trailer;

FIG. 5 is a flow chart of the steps involved in the shake analysis comparison;

FIG. 6 is a flow chart of the steps involved in the click analysis comparison;

DETAILED DESCRIPTION

Figure 1:
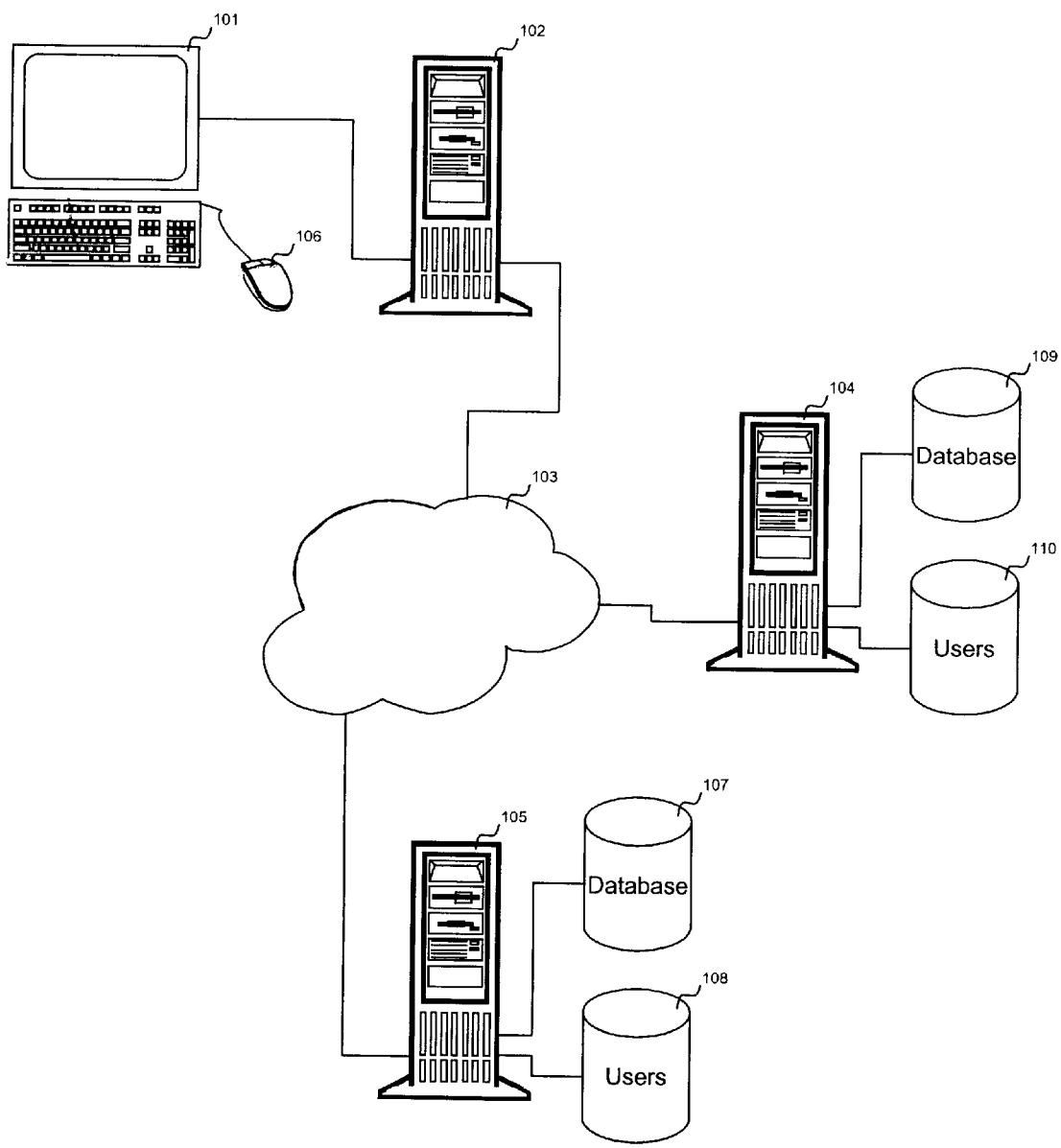
FIG. 1 is a block diagram of a system for administering and implementing a web signature validation protocol according to an embodiment of the present invention.

The present invention generally relates to a system for and a method of digital signature recognition in an internet or intranet environment. In general, the invention includes having an individual desiring to use the authentication process access a web signature authentication server (WSAS) and registering their authenticated pointing device (PD) signature. The authenticated PD signature preferably includes cursor movements and PD mode information. Cursor movements may be made by the individual at the end user remote personal computer (PC) by moving the cursor on a display screen using a PD, such as a mouse, connected to the remote PC. PD modes in this context include depressions of buttons on or associated with the PD, movements of one or more positioning wheels included on the PD, or any other functionality included in (or associated with) the PD connected to the remote PC. Once the WSAS has accepted and stored an authenticated PD signature, the individual may then access licensee web sites on the Internet and have their sample PD signature validated. A licensee web site is one which has contracted with the WSAS to have user verification services performed for that web site. When an end user attempts to access, perform or utilize a function on a licensee web site that requires authentication of the identity of the end-user, the licensee web site sends the authentication request to the WSAS. The WSAS then sends a virtual pad to the end user on which the user is to sign. The virtual pad consists of three main parts including (1) a user preferred skin background image, (2) user preferred graphic objects which are (3) mapped into the background. The end user, using a PD, enters a sampled PD signature on the virtual pad. The sampled PD signature is sent to the WSAS which compares the sampled PD signature to the authenticated PD signature provided by the end user during registration and as periodically updated with authenticated signatures. If the sampled PD signature compares favorably with the authenticated PD signature the WSAS relays authentication information to the licensee web site indicating that the identity of the end user has been verified. The end user may then continue with their transaction.

The implementation of a mouse signature makes it possible for the user to repeat hand gestures with a mouse in a way that the user can be efficiently identified. Thus, instead of the fine motor movements characterizing a written signature, the invention uses gross motor skills and individual characteristics thereof (as might be observable using a computer mouse) to identify a user.

The present invention uses an "object map" model to perform mouse-based user authentication. One problem of signing with a mouse is that the mouse is not a regular device for signing, in comparison to the regular pen. That is, manipulation of typical computer pointing devices relies, to a large extent, on gross motor skills while prior handwritten signatures rely on fine motor skills employed in using a pen. Thus, many PC users have difficulties repeating their web signature accurately using a PD. In order to overcome this difficulty two main components are used: (1) the Web Signature Recognition Engine contained in the Server and (2) the virtual pad on the end user/remote user side. The virtual pad is enhanced with objects that are initially randomly placed on the virtual pad signing surface/zone. Within the server there is a Web Signature Recognition Engine that provides the Digital Signature Authentication Capabilities. The Web Signature Recognition Engine analyzes hand gesture signatures that were sampled by the virtual pad and the pointing device. This engine is enhanced with an adaptive algorithm based on soft computing and neural network technologies.

When a signature authentication request has been generated by a remote Licensee website (e.g., e-commerce, e-banking, B2B, B2C, etc. website) and a sampled PD signature is delivered to the WSAS for authentication then, the previously registered authenticated PD signature (or some characterizing data thereof) for that user is loaded from his/her personal security profile. A signature comparison check is generated and performed by the Web Signature Authentication Recognition Engine. The newly sampled PD signature is thusly compared to the stored authenticated PD signature, that is, the original stored signature (created during the initial process) as periodically updated with other authenticated signatures during intervening system learning. Since it is expected that a user's signature will become more uniform over time enabling the system to achieve a more accurate recognition, the system includes facilities to learn the most significant and new features of new signature (and authenticated) samples. According to these comparison results, the system measures the level of correlation between the authenticated PD signature and the sampled PD signature. Then, the system generate a "Go" or "No Go" message to the Licensee web site and the remote user. Of course, only validated signature samples are used to update the stored exemplar pattern data used for future comparisons.

FIG. 1 is a system block diagram illustrating an information flow according to one embodiment of the present invention. The end user, using remote PC 101 and a network access server 102 (e.g., an Internet service provider), accesses a communication network such as Internet 103 to communicate with licensee website server 104. Remote PC 101 typically includes a pointing device such as mouse 106. Licensee web site server 104 responds to a web browser running on PC 101 by transmitting an HTML encoded web page which is displayed on remote PC 101 requesting the end user to verify their identity by signing or logging in. This verification step is required in order to authenticate the request and allow the user to have access to the system resources or to confirm a requested transaction. The end user enters a user name or other identifying information and clicks or selects a displayed button on the screen on remote PC 101 to activate an authentication program. The authentication program authenticates the signature of the end user and thereby verifies the identity of the end user. Upon receiving information indicating the selection of the authentication request button, licensee web site server 104 redirects the request for authentication to web signature authentication server (WSAS) 105 for authentication. The licensee website may independently inform the WSAS that a user has been redirected for authentication or may rely on the user to provide necessary initial login information to the WSAS.

After the user establishes communications with the WSAS, a session is started for the user and the WSAS 105 sends a virtual pad via a communication network such as Internet 103 and server 102 to the end user which is displayed on remote PC 101. Using a PD, such as mouse 106, the end user submits a sampled PD signature using remote PC 101. One of ordinary skill in the art would appreciate that the present invention may be implemented with any pointing device such as a mouse, trackball, stylus, touch pad, touch screen or any other pointing device that may be used to manipulate the cursor displayed on the virtual pad on remote PC 101. The sampled PD signature submitted by the end user uses the virtual pad displayed on remote PC 101 for reference. This virtual pad includes (1) a user preferred skin, background picture or background image, (2) user preferred graphic objects which are (3) mapped onto the background. The sampled PD signature submitted by the end user may include cursor movements around objects displayed on the virtual pad, movement of objects mapped on the background, depression of PD (e.g., mouse) buttons, movement of other features of the PD such as a selector wheel, and other PD directed actions.

The sampled PD signature received by remote PC 101 is sent via server 102 and Internet 103 to WSAS 105 for authentication. In addition, a trailer is also generated and sent via server 102 and Internet 103 to WSAS 105. The trailer is generated by a one-way hash function to provide a message digest of the PD signature, i.e., a number that is a function of an individual signature. For each individual instance of a signature a semi-unique trailer is calculated. The trailer is used to confirm message integrity and identify stolen signatures which are sent to the WSAS 105 for authentication. Trailers received with sampled PD signatures which are authenticated are stored for later use. Since the trailer of a stolen signature would be identical to a trailer of a previously submitted PD signature as found in database 107 of the WSAS 105 system, this duplication of trailers indicates the exact same signature was previously received by WSAS 105. One of ordinary skill in the art would appreciate that an end user will not be able to exactly duplicate their PD signature from one PD signature to another PD signature. Therefore, when the exact duplicate PD signature is received (as indicated by a duplicate trailer), the trailer is used to identify that the sampled PD signature represents a stolen signature which has been stored electronically and resent at a later time (i.e., a "replay" attack). In this case, the identity of the user is not authenticated.

Any number of one-way hash functions may be used to generate the trailer. For example, the MD4 or MD5 hash algorithm of Ron Rivest, and the Secure Hash Algorithm (SHA) designed by NIST and NSA may be used. See, also, U.S. Pat. No. 4,908,861 of Brachtl et al. issued Mar. 13, 1990 describing MDC-2 and MDC-4 hashing and, in general, Handbook of Applied Cryptography, Fifth Printing, Menezes, van Oorschot and Vanstone (2001), Chapter 9 "Hash Functions and Data Integrity."

Each individual signature has a semi-uniquely calculated trailer. If a signature is forged it is extremely difficult to forge the correct trailer without knowing the trailer's formula, i.e., the hash function or key used by the hash function to generate the trailer. The trailer has a very compact representation (e.g., 128 or 160 bits) and can be stored in a database. If a sniffer regenerates a stolen signature then the trailer will be found in the database which means that the exact same signature was already received and access should be denied. One of ordinary skill would appreciate calculation of the trailer may include present date or time information, machine identification information or other information represented in the trailer.

Alternatively, according to a preferred embodiment of the invention, a representative trailer algorithm may be based on summation of values that are multiplied by very big (above 1,000,000) prime numbers from two different tables. This approach may use several algorithms. A preferred algorithm is similar to CRC. In CRC, each temporary result is used to calculate an entry into a table of values. FIG. 2 includes a C++ code excerpt that shows a simple trailer calculation that uses two tables of prime numbers. The intermediate values that are calculated in FIG. 2 are summed up and are not used as in CRC to calculate the next table entries.

When the sampled mouse signature is received by WSAS 105 the trailer is analyzed to determine whether the received sample PD signature satisfies some initial security checks and should be processed further. Once the trailer analysis is completed, in other words a unique trailer consistent with the signature has been received, the sampled PD signature is forwarded for comparison with an authenticated PD signature for the end user as stored in database 107. (Note, as further described below, features extracted from the PD signature may be used as a basis of comparison instead of comparing and storing a sampled PD signature directly). If the trailer is not validated a message is sent to licensee web site server 104 to cancel the pending transaction or pending access. WSAS 105 employs a dynamic biometrical recognition engine to compare the mouse signatures. If the sampled PD signature is compared successfully to the authenticated PD signature stored in database 107, the information is sent to the end user at remote PC 101 and to the licensee website server 104. The end user may then proceed with the transaction or login. WSAS uses the validated sample PD signature to update the authenticated PD signature (or features extracted therefrom) stored in database 107.

Figure 3:
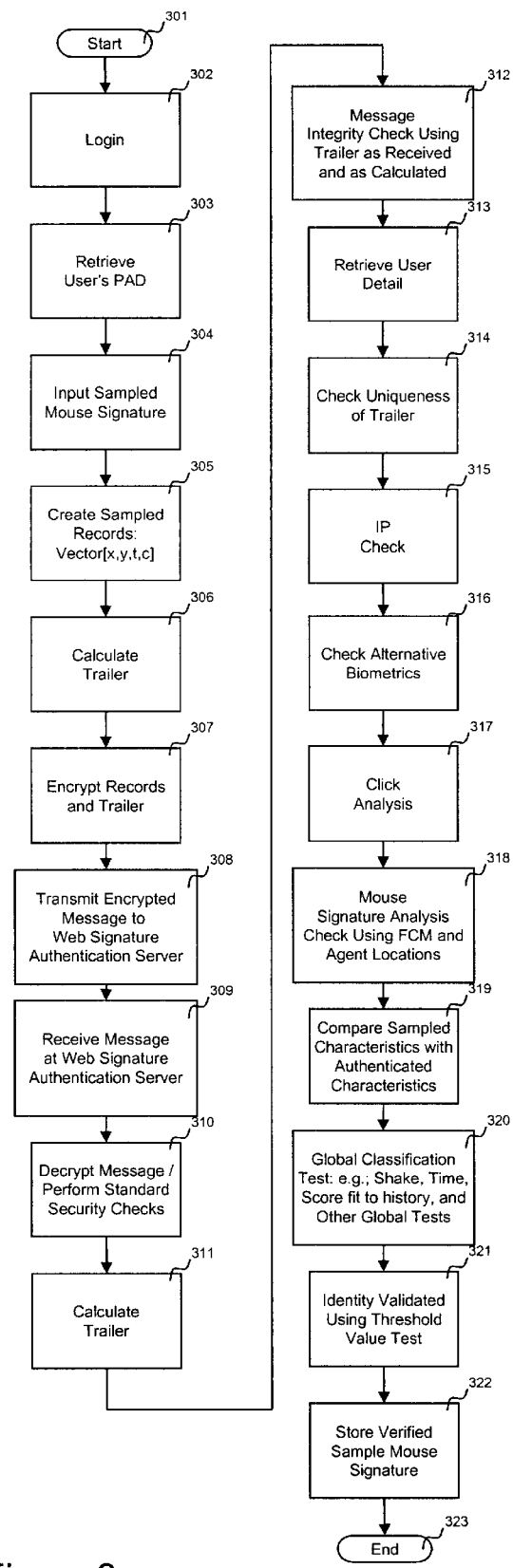
FIG. 3 is a flow diagram of a method of validating an identity of a user.

FIG. 3 is a flow diagram of the overall method of identifying a registered user. After entering the method at step 301, a login process is performed at step 302. This login process may include receipt of a verification request message from an associated licensee platform such as an e-commerce website requiring PD signature verification of a customer being redirected to the WSAS. This message may be transmitted directly from the e-commerce site to the WSAS (e.g., via a virtual connection over the Internet, e-mail, instant messaging, etc.), may be incorporated into the redirection message (e.g., using a CGI script), or may be sent by the user in response to the user accessing the WSAS. In response to the login, a session is established with the user and, at step 303, the user's virtual pad is retrieved and transmitted to the user. As previously described, the virtual pad includes both the background image previously selected by the user together with draggable icons positioned on the background.

The user inputs a sampled PD signature at step 304. It is understood that the term "PD" is used for convenience of the present example and is representative of a host of pointing and locating devices including, but not limited to, a computer mouse, trackball, touchpad, graphics tablet, joy stick, touch sensitive screen, light pen, eye control input device, etc. This signature is represented by a sequence of vectors, each vector including, for example, x, y coordinates of a sample; a time value associated with the sample, and a PD mode parameter value. Once the user accepts the signature, the appropriate vectors are packaged as a record at step 305 and a trailer for the vectors is calculated at step 306. Since the trailer practically uniquely identifies the PD signature data, it is used both for message integrity purposes and is checked by the WSAS to confirm that the signature data is not part of a replay attack. The latter check is based on the understanding that it is statistically impossible for a user to create two exactly identical signatures such that subsequent receipt of a previously received PD signature indicates an error or potential replay attack.

At step 307 the PD signature records are encrypted together with the associated trailer. The encryption may use a variety of techniques including RSA public key encryption, DES secret key, or Windows Secure Socket Layer (SSL). In addition, other security services may be incorporated such as client authentication using digital certificates. The encrypted message is then transmitted to the web signature authentication server at step 308.

After receipt of the encrypted message by the WSAS at step 309, the message is decrypted at step 310 and standard security checks are performed. These checks may include user digital certificate verification, message integrity checks, etc. At step 311 a trailer for the sampled records is calculated and, at step 312, this calculated trailer is compared with the received trailer as decrypted to verify message integrity. User detail including user profile information is retrieved at step 313. Preferably, the user detail, including user identification information, is stored in a secure, encrypted format to avoid unauthorized disclosure of user identity and related information.

Uniqueness of the trailer is checked at step 314 to guard against reuse of a previously received PD signature indicating a possible replay attack. Once this check is made, several other initial checks are performed prior to signature analysis. For example, step 315 implements a check of the IP address associated with the user. This may include checking for an IP address of a known hacker or of addresses associated with domains likely to include hackers or others to whom access should be denied. Alternatively, for more secure access, a requirement may be added requiring a PD signature to originate from a specific IP address associated with the user.

Alternate biometrics are checked at step 316. Such biometrics may include, for example, data from a thumbprint reader integrated into a mouse device, a voice print processor, etc. At step 317 a "click" analysis is performed to verify that the sequence of PD modes represented by the sampled PD signature are consistent with the registered PD signature of the user. Preferably, this analysis is performed using the same methods and technique used to match PD signature traces, although other methods may be used.

A PD signature analysis is performed on the sampled mouse signature at step 318. This includes placement of agents at locations defined by the user's profile and previously authenticated PD signature, i.e., the associated exemplar PD signature (as updated). FCM is then used to migrate the agents to minimum energy potential or minimum cost locations with respect to the newly sampled PD signature. A statistical analysis is then performed of the geometry of the final agent locations in comparison to the geometry of the final agent locations associated with the stored authenticated PD signature so as to identify a fit parameter value. Thus, at step 319, the sampled characteristics (e.g., final agent geometry) are compared with authenticated characteristics (e.g., agent geometry associated with the exemplar PD signature) to determine if a threshold value is satisfied indicating a match. Note that the match criteria threshold may be adjusted based on factors such as user learning and improvement, time since last use of the system, authentication reliability requirements, service provider (i.e., licensee) specifications, etc.

Upon completion of the PD signature analysis check and comparison, a global classification test may be performed at step 320. Such global test examines the entirety of the data for consistency with known user characteristics such as PD or "mouse" shake, signature completion time, match score history, etc. For example, each user may exhibit a detectable amount of noise in their signature attributable to shake. Similarly, each user may have a characteristic time required to complete the signature input process. Score history may also be indicative of a user and/or of a series of unsuccessful attempts to duplicate a user's signature. As with other tests, including detection of suspected hacking, the WSAS may inhibit further attempts to authenticate a signature or take other action to notify a user or a service that such attempts have been detected.

At step 321 the identity of the user is validated using an appropriate threshold value test or other technique appropriate to the level of security required. Once verified, the sample PD signature is stored at step 322 for later use in updating the sample signature (e.g., updating a set of final agent locations associated with a series of exemplar and verified signatures.)

Figure 4:
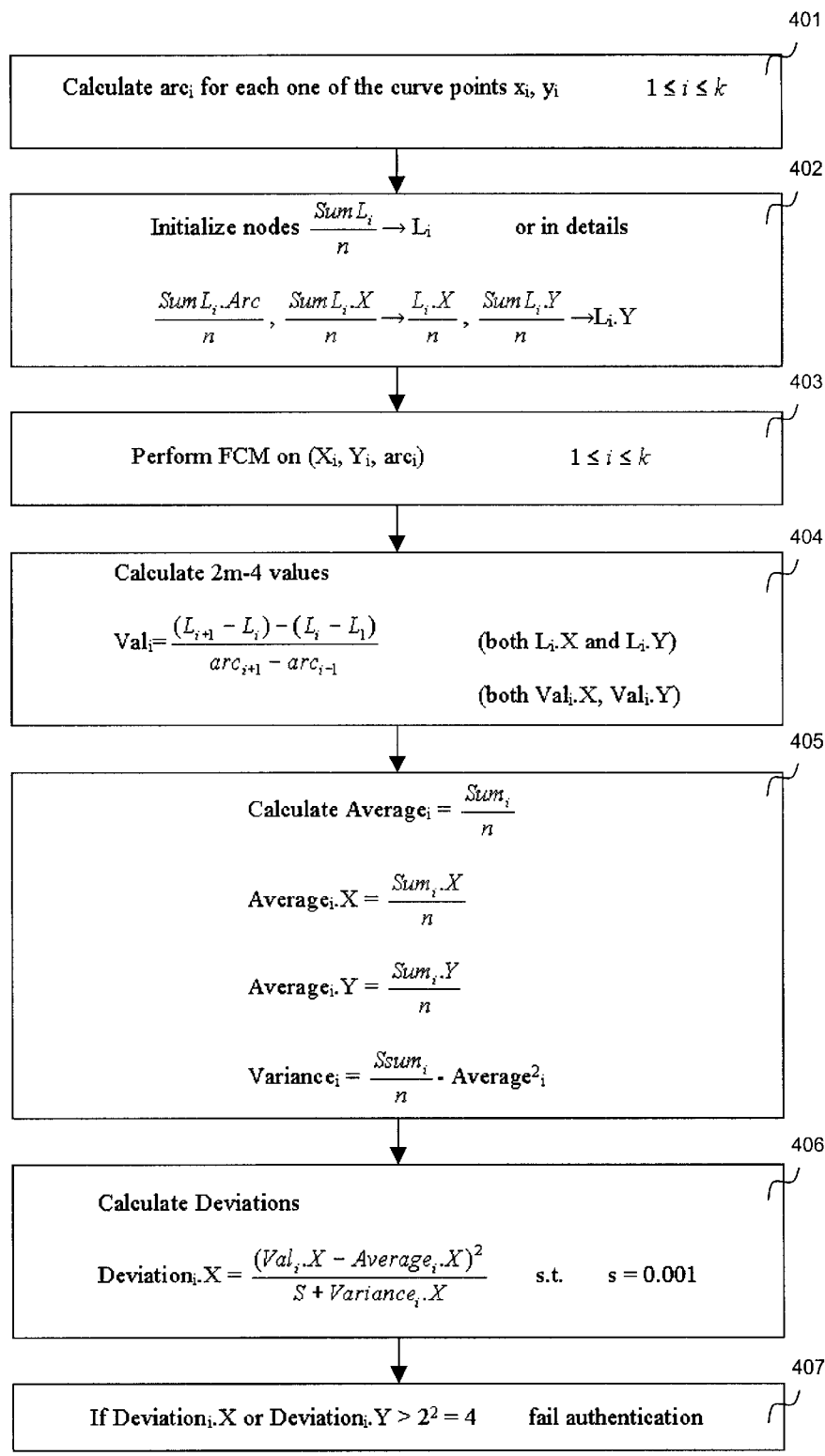
FIG. 4 is a flow chart of the steps involved in the signature comparison process.

FIG. 4 is a flow chart of signature comparison process. In step 401 an arc is calculated for each of the sampled curve points. In step 402 each of the nodes is initialized. FCM is performed for each of the nodes in step 403. A pair of characteristic values for each internal agent is calculated in step 404. Averages are calculated in step 405 as a global value representative of the PD signature as a whole. Deviations are calculated in step 406 and a decision is made in step 407 as to whether the sampled signature is accepted or not.

FIG. 5 is a flow chart of the shake analysis comparison which may be performed as part of the signature comparison. In step 501 a calculation is performed to determine the number of sign changes for the curve directions. In step 502 the average and a variance are calculated and in step 503 the deviation of these values from the authenticated signature information is determined. If the shake values widely vary (e.g., have a deviation greater than 9), then the test is failed.

FIG. 6 is a flow chart of the click analysis comparison. In step 601 the mode values of the sampled vector set are inspected to determine how many "mouse" clicks are sensed. In order for a mouse depression to be considered a click, the pattern $(0, 0, n_1, n_2)$ where neither $n_1$ nor $n_2$ is zero and $n_1$ may equal $n_2$, (for example, (0 0, 1, 1)) is identified in the PD mode values. This combination indicates that for two successive periods the mouse button was not depressed and for the following two successive time periods the mouse button was depressed. In step 602 the average and variances are calculated and in step 603 the deviations are calculated. In step 604 a determination is made as to whether the click analysis was successfully passed (e.g., a deviation of 9 or less) using some threshold value.

Figure 7:
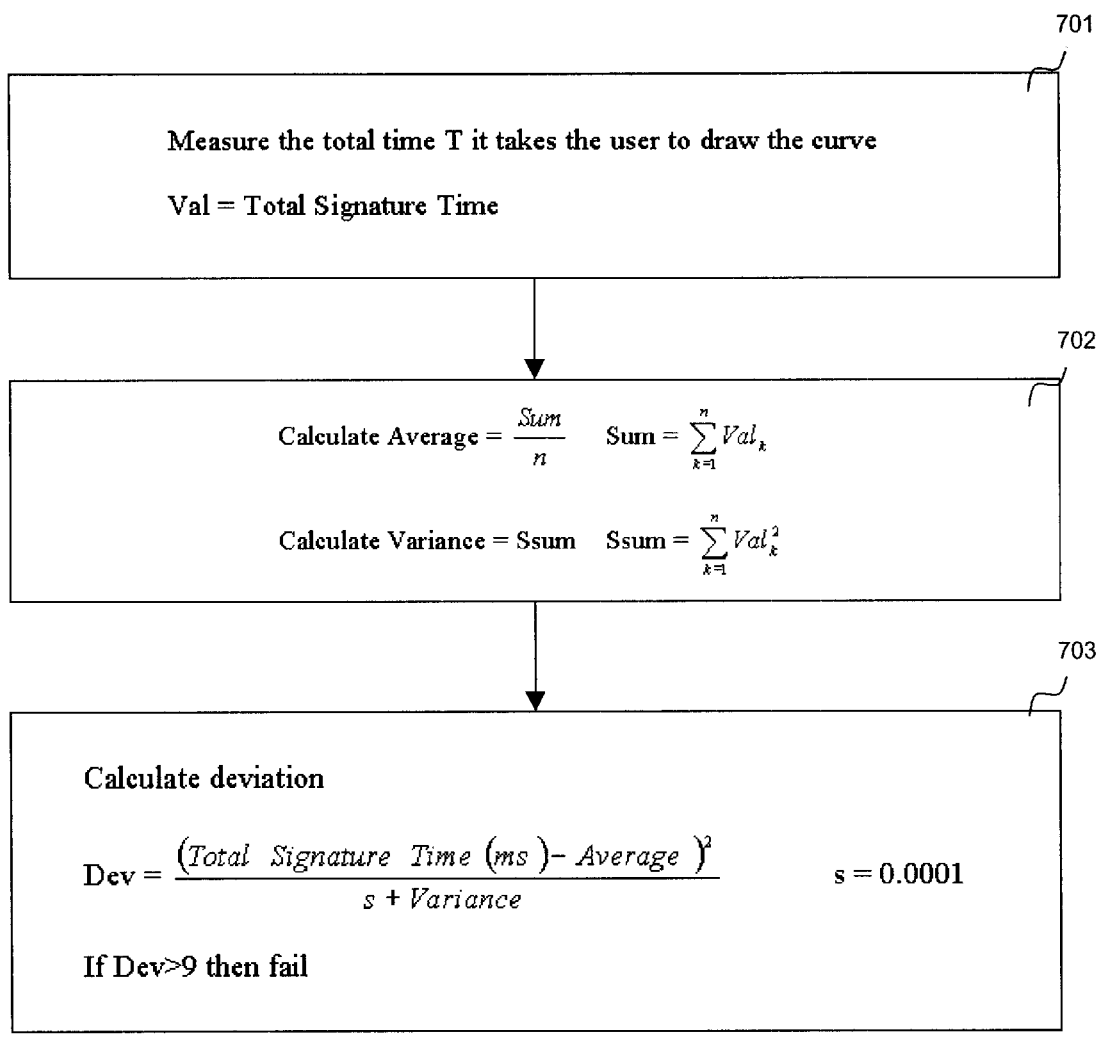
FIG. 7 is a flow chart of the steps involved in the time analysis comparison.

FIG. 7 is a flow chart of the time analysis comparison which may be performed as part of the signature comparison. In step 701 a calculation is performed to determine the total signature time. In step 702 the average and a variance are calculated and in step 703 the deviation of these values from the authenticated signature information is determined.

Figure 8:
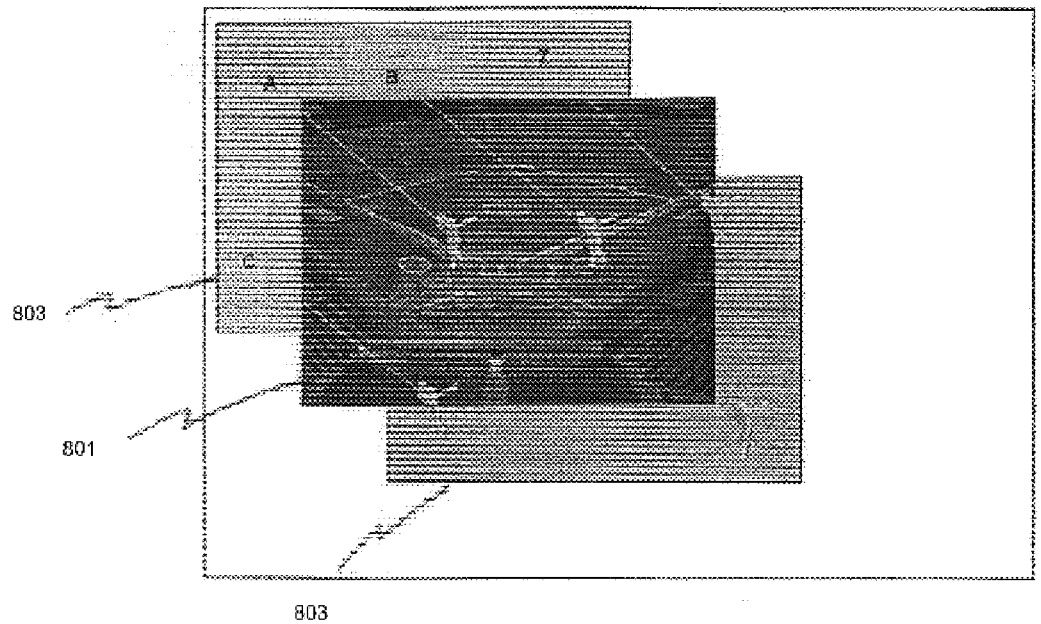
FIG. 8 is a sample computer screen shot of a virtual pad of the present invention showing the components of the virtual pad.

FIG. 8 represents one embodiment of a virtual pad of the present invention showing various image planes constituting the virtual pad. The virtual pad includes three main components: background image 801, user preferred graphic objects 802 mapped in the background image 801 to form composite image 803. As more fully described below, during the registration process the user initially selects a preferred background skin, background picture, or background image. A background image may include a picture. For each user, user selected preferred draggable icons or graphic objects 802 are mapped onto the background image at locations created randomly. The position of these objects mapped to the background are represented in composite image 803.

The three main components which are included in the virtual pad selected by a user are stored in a personal user profile as part of the user security information and is used to identify and provide the user with an individualized virtual pad. This record is encrypted and stored in the system or the operating system security database 107 (FIG. 1) and contains the information required to authenticate a user including the user security key SUID and the user rights and privileges to access directories, files or other information in the system database/resources. It may also contain information related to the user's identification including the user's name and/or the user's ID, e-mail address; an optional conventional password; public key, copy of the user's certificate, additional private information; and object map data.

The background picture is used to give the user his/her personal visual reference points to navigate the screen using the PD and to provide the opportunity to customize draggable icons and placement thereof as part of the user's signature. These personal visual references help the user to remember and redraw his unique digital PD signature. Thus, the background picture becomes a part of the virtual pad on which the user can draw a curve or a series of curves using the PD, i.e., mouse. Each time the website generates a request for authentication, a user-unique virtual pad appears on the user remote PC, and allows the remote user to enter a PD signature. During the process of loading the virtual pad on the remote user PC, the user profile is loaded from a database with the user information containing the user's background skin (picture) with the user's objects map information. Once the loading process finishes, the virtual pad is ready to sample the user input PD signature.

Background image 801 includes the user's preferred graphic objects 802 where the locations of the objects are set by the system randomly. Each graphic object in the list consists of three other data items including: (1) the X-coordinate of the location of the graphic object in relation to the upper left corner of the background picture; (2) the Y-coordinate of the location of the graphic object in relation to the upper left corner of the background picture; and (3) a type index that represents the user's preferred graphic object. For example, object type number #1001 is an icon of a cat image, object type number #1002 is an icon of a dog image, etc.

The object map method implemented in the WSAS of the present invention introduces a new concept for using the universal PC mouse (or other PD) for signing a digital signature and using the mouse (or other PD) to identify the remote user efficiently. The model produces a virtual pad, which samples the user digital signature at the user remote PC online and, in real time, identifies the user. The digital signature may be considered to be a type of dynamic password. One of ordinary skill in the art will appreciate that the PD signature of the user is always different from previous PD signatures. The sampled PD signature consists of a set of points (vectors) that are sampled by the virtual pad at a nominal rate of 30 Hertz (times per second), and therefore, is, for all practical purposes, not repeatable.

Figure 9:
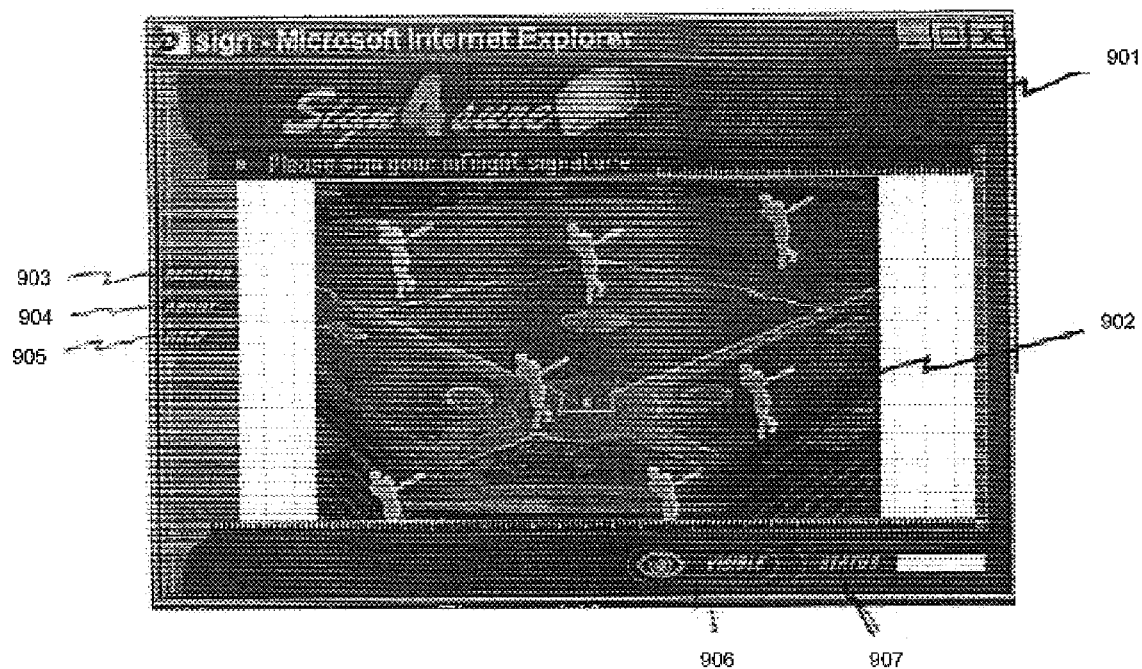
FIG. 9 is a sample computer screen shot of a typical virtual pad according to one aspect of the present invention.

FIG. 9 is a screen shot of a typical virtual pad used in a preferred embodiment of the present invention. As described, the virtual pad consists of a background skin layer (which, in the example, is a baseball game field), and user preferred graphic objects mapped to a composite layer. The virtual pad shown in FIG. 9 may be implemented using a JAVA script running on the user's (i.e., client) PC. The virtual pad includes a design frame 901 and a signing zone 902. The design frame 901 is used to present information to the user such as title, user guide instructions, important links such as a "register" new PD signature option 903, information about the screen or service 904, a help page or service 905, a visible/invisible switch 906 (to hide or display a cursor history trail line) and a signature processing status area 907. Signing zone 902 is located within the virtual pad frame and includes the baseball game field with the white grid horizontal edge. Once the end user has completed submitting their PD signature on the remote pad, the virtual pad scans the drawn signature from left to right by implementing a moving screen which travels through the virtual pad. Once the virtual pad has been scanned a message may be displayed to the end user in status box 907 such as "checking" indicating that verification processing is pending.

Figure 10:
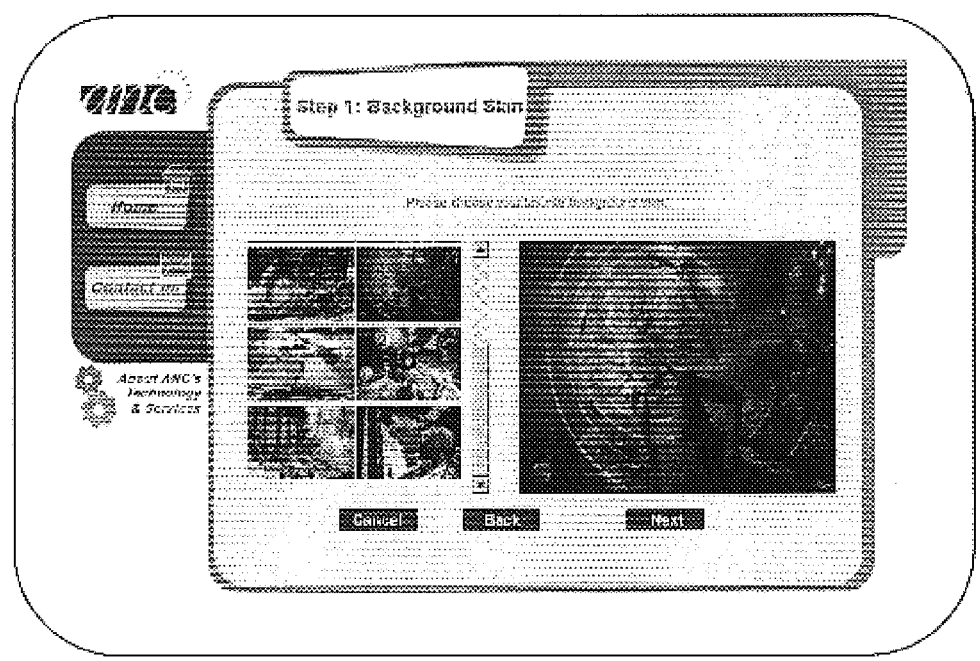
FIG. 10 is a sample screen shot of a registry screen providing for user selection of a background.
Figure 11:
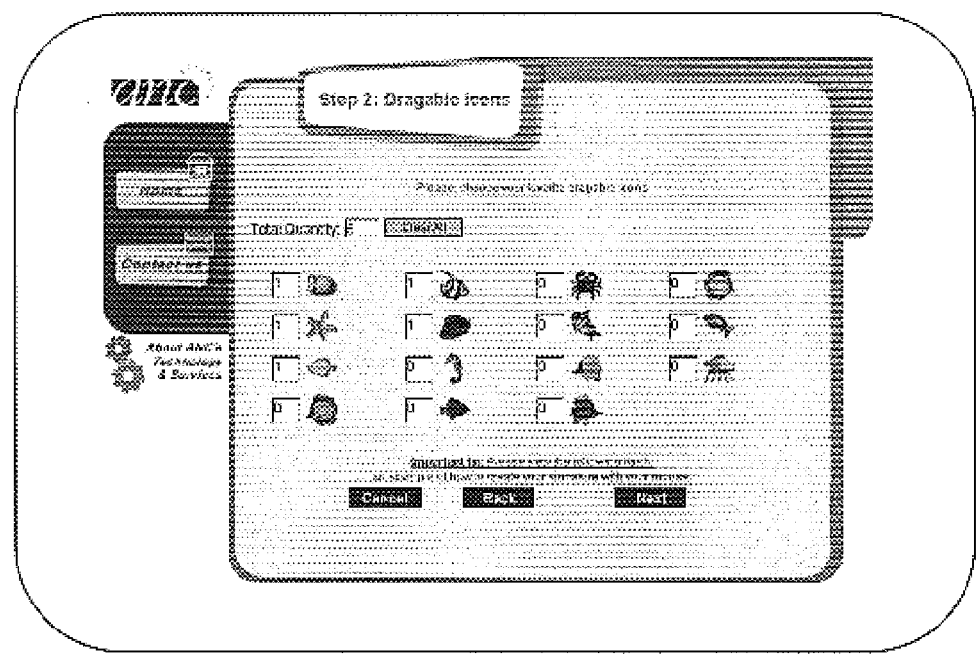
FIG. 11 is a sample screen shot of a registry screen providing for user selection of type and number of draggable icons.
Figure 12:
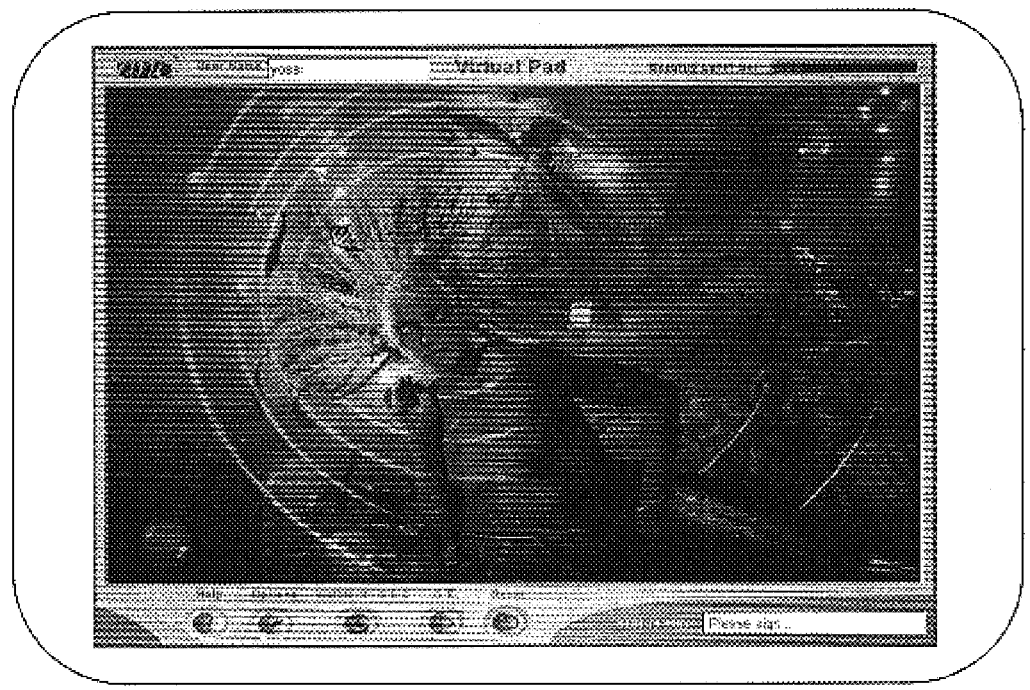
FIG. 12 is a sample screen shot of a virtual pad resulting from a user selection of backgrounds and draggable icons per FIGS. 10 and 11.

The virtual pad of FIG. 9 is generated during a registration process. The user registration process allows a user to register for the service and store their digital PD signature features and tracking records on the WSAS server. The user will also be able to manage his/her profile and set personal settings for his/her digital PD signature. The registration process includes the following steps. First the user is given the opportunity to choose a preferred background skin (FIG. 10). If a preferred background skin is not chosen by the user, the system randomly chooses a background skin from a given default collection. Next the user submits their preferred number and type of graphic objects (i.e., draggable icons) which will appear within the virtual pad (FIG. 11). The user may be given the opportunity to select a number between a minimum number and a maximum number of objects. If no selection is made, the system chooses the default number. The composite of the background image and randomly placed preselected draggable icons is shown in FIG. 12.

Figure 13:
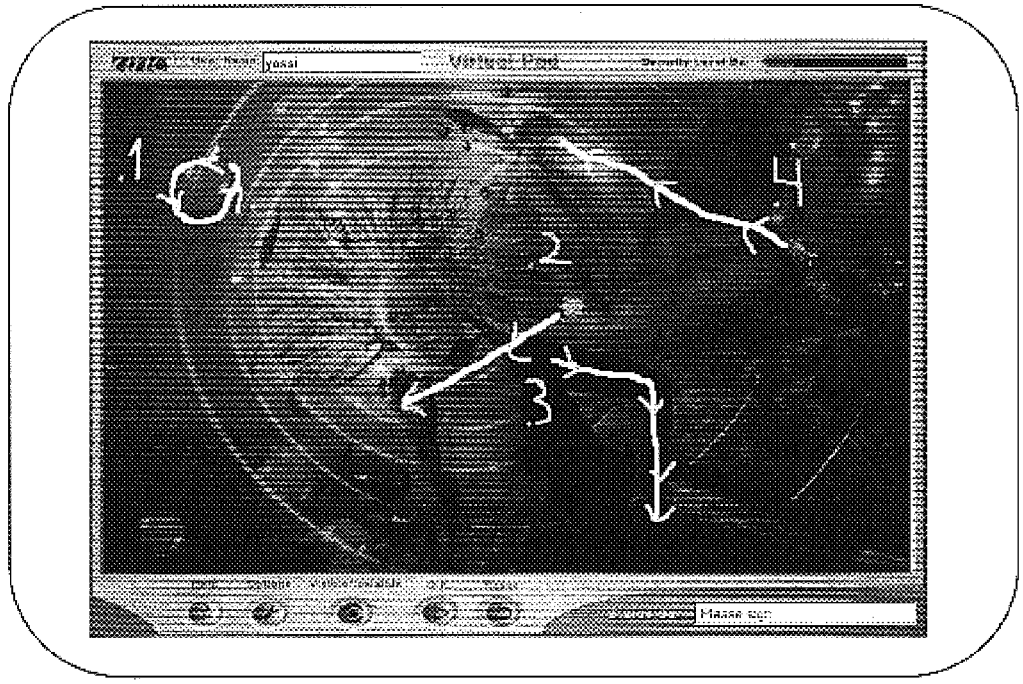
FIG. 13 is a sample screen shot of a user signature displayed on the virtual pad of FIG. 12 further including reference numbers in the screen shot.

The user is required to submit several sampled exemplar PD signatures using the virtual pad and the PC PD (FIG. 13). In a preferred embodiment four sampled signatures are submitted. These sampled mouse signatures are provided to the WSAS for learning and analyses. Using this information, the WSAS generates an authenticated signature. The system stores the authenticated signature (and/or parameters characterizing the PD signature such as agent geometry) and the related information as part of the user personal security profile. The original authenticated signature begins as a combination of these initial four (or three best of the four) signatures but is modified, over time, with the characteristics of authenticated PD signatures as PD signatures are authenticated.

The authenticated signature is necessarily different from any other of the user's sample PD signatures. Instead of points and movement vectors represented as a set, the authenticated PD signature is a varying length file representing the previous analyzed signatures of the user. The file consists of binary information representing calculations made on the inspected and learned signatures. This information represents a gradual learning of the most significant features of the user's digital PD signature. The resultant stored digital signature file represents the user's personal and unique PD digital signature. This stored PD signature is created and updated based on accumulative learning of all user previous approved digital PD signatures, starting from first stage, the registration, and then based on any other valid PD signature which was approved by the system and automatically and periodically studied in a background process by the system.

Figure 14:
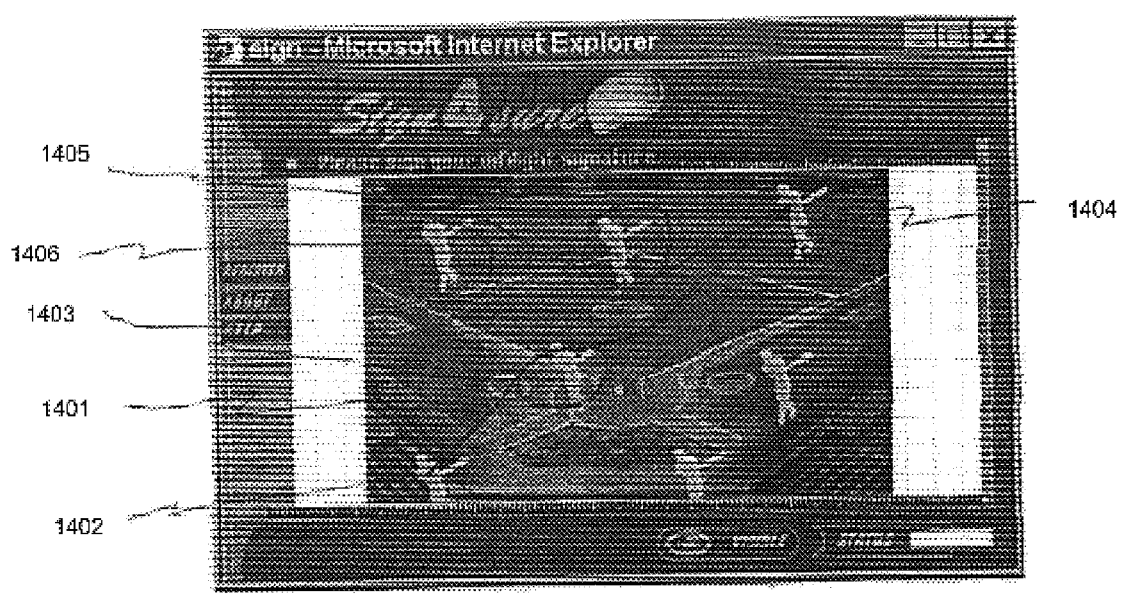
FIG. 14 is a sample computer screen shot of a user's sampled digital signature.

FIG. 14 is another example of a user's sampled PD signature. As can be seen by sampled PD signature 1401, the signature starts on ballplayer 1402, heads towards and encircles in a counterclockwise direction ballplayer 1403, heads towards and touches ballplayer 1404, heads towards and encircles in a clockwise direction ballplayer 1405 and finally heads towards and encircles in a counterclockwise direction ballplayer 1406. The cursor movements which make up the sample mouse signature are typically performed by a PD such as a mouse. The sampled PD signature may include simple cursor movements (see lines 1, 3 and 4 of FIG. 13), selection and movement of objects on the displayed screen (see fish 2 of FIG. 13), depressions (or clicks) of mouse buttons (not displayed), or similar motions. The sampled mouse signature typically begins with a depression of a mouse button or some other indication from the user that the PD signature is about to begin.

Figure 15:
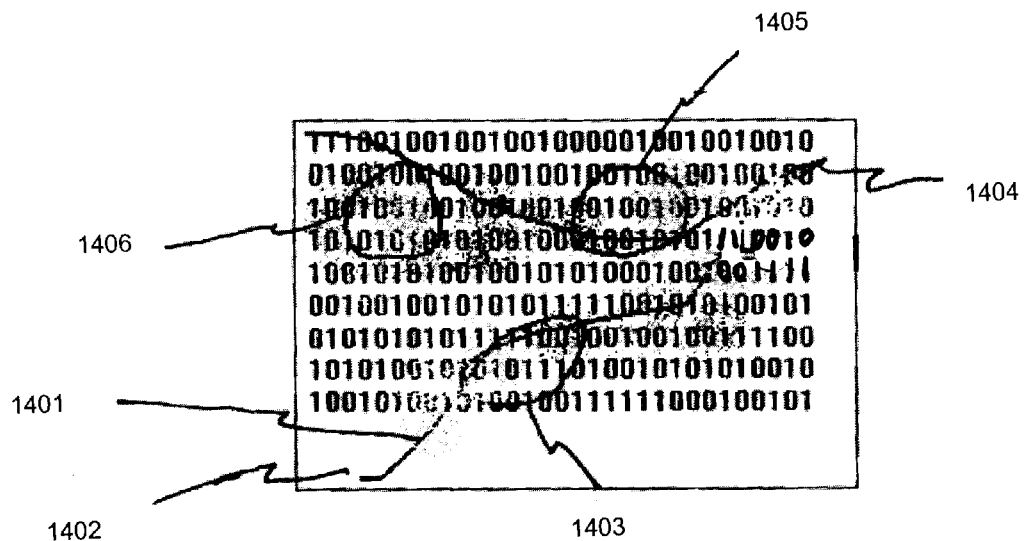
FIG. 15 is an example of an authenticated mouse signature.

FIG. 15 shows an example of data representing an authenticated mouse signature which is analyzed to determine the characteristics to be stored in database 108. In one embodiment of the present invention the display is divided into 128,000 elements horizontally and 96,000 elements vertically. These elements are used to determine the x and y coordinates of the cursor while the cursor is being moved by the end user.

Figure 16:
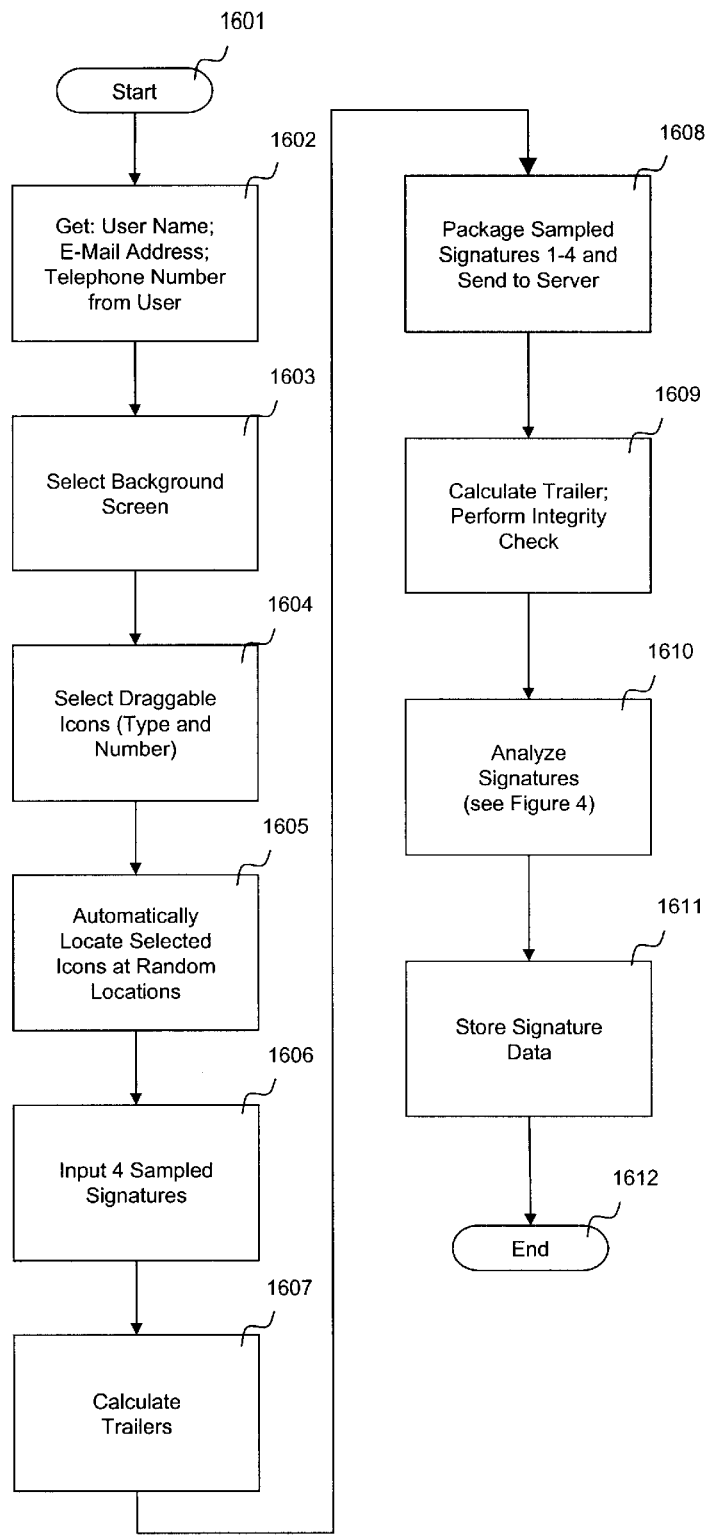
FIG. 16 is a flow diagram of a method of registering a user with a signature recognition system according to the invention.

FIG. 16 is a flow diagram of a method of registering a user with a PD signature recognition system. Entering at step 1601, the method obtains information identifying a user at step 1602. Identifying information may include user name, e-mail address, telephone number, and other information.

Some or all of this information may be passed to the WSAS supporting the method by a requesting service (e.g., licensee website) such as an e-commerce web site using the verification service for its customers. The user may likewise provide some or all of this information directly to the WSAS using standard HTML forms or other electronic (or manual) means such as e-mail. If transmitted electronically, the information may be verified by a number of means including, for example, using a digital signature or certificate.

Once this information is received and, as desired, verified by the WSAS, the user may select a background screen at step 1603 (see also FIG. 10). The background screen provides orientation and reference points for the user when manipulating a cursor on the screen. A plurality of images may be provided or, alternatively, the user may provide their own background image (e.g., family portrait, etc.) At step 1604 the user selects one or more of various draggable icons to be placed on the background (see also FIG. 11). While the draggable icons provide further options and diversity in the signature by allowing the user to "click and drag" an icon instead of merely drawing a curve on the background, the icons also provide additional reference points for the user when manipulating the PD (e.g., mouse). The selected types and numbers of icons are randomly located on the background image at step 1605 (see also FIG. 12). These locations will form the starting point for all future signature input screens and form part of the virtual pad.

A predetermined number of sample or exemplar PD signatures are input at step 1606 (see also FIG. 13), in this case four sample signatures are provided by the registering user. According to one embodiment, positional (e.g., x, y), time, and mouse mode information in the form of a collection or series of vectors for each exemplar or training PD signature is stored on the user's machine as the user accepts each signature for use as an exemplar. At step 1607 trailer information is calculated for each of the locally stored exemplar signatures. The trailer information is formed by processing the vectors using a one-way hash function such as MD4, MD5 or SHA-1 or as previously described to form a digest representing respective signatures. The trailer information is used both to confirm message integrity of the PD signature vectors and to uniquely identify signatures to protect against a replay attack, i.e., the reuse of intercepted signature data. The exemplar signatures and associated trailers are packaged at step 1608 and sent to the WSAS for processing.

Once received at the WSAS, trailers for the received PD signature vectors sequences are computed and compared in step 1609 with the trailers as received. If the respective trailers match, message integrity is confirmed. At step 1610 the signatures are analyzed, as will be described in more detail below, so as to extract parameters used to identify the signature and train the web signature authentication server to recognize the PD signature. This information is stored in the appropriate user profile at step 1611, the method terminating at step 1612.

Figure 17:
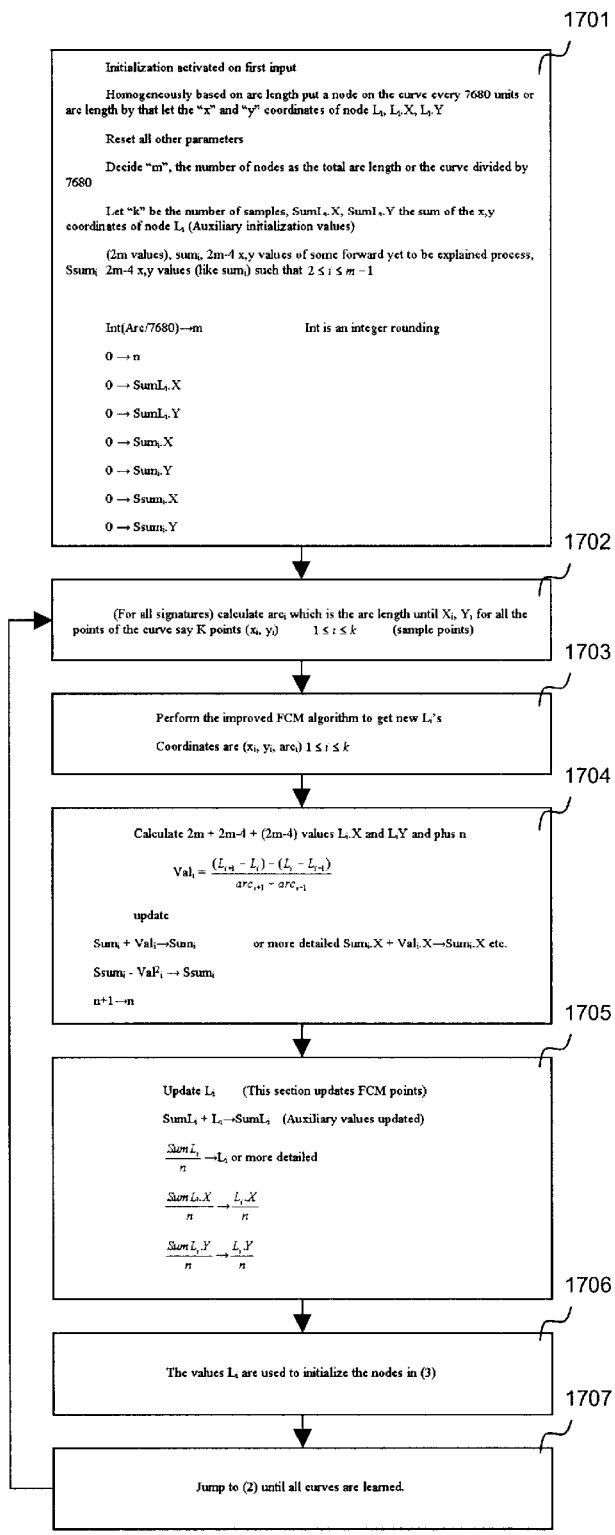
FIG. 17 is a flow chart of the steps involved in the signature data updating and learning process.

FIG. 17 is a flow chart of a method updating stored exemplar PD signature data to incorporate recently validated sample PD signatures. This method may also be used during initial user registration to form a composite of several exemplar signatures provided during the registration process. At step 1701, variables are initialized and agent or "node" spacing is calculated. At step 1702, the PD signature is divided into a number of equal arc lengths and, at 1703, FCM is performed to migrate the agents or nodes to minimum cost locations relative to the PD signature curve. At step 1704 a set of values is calculated characterizing the geometry of the agents or nodes based on their final position relative to the PD signature curve. Step 1705 forms sums of the values characterizing the agent or node geometry, thereby blending the geometries to form an average or composite geometric description of the several PD signatures. At step 1706, the calculated initial agent or node locations are adjusted consistent with the blended values. Step 1707 repeats these steps until all curves have been considered and blended.

Figure 18:
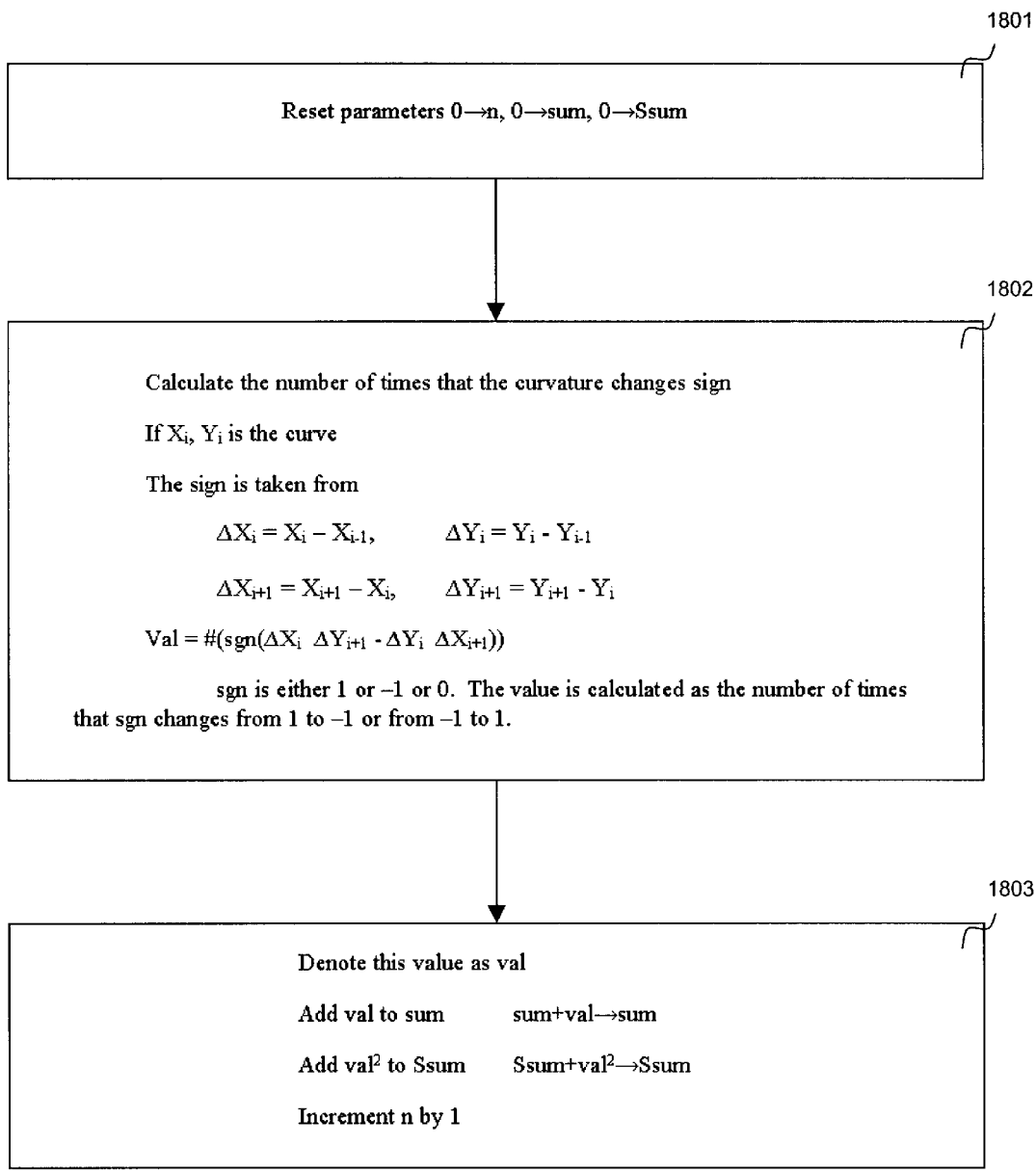
FIG. 18 is a flow chart of the steps involved in the shake analysis learning mode.

FIG. 18 is a flow chart of a shake analysis learning method whereby shake parameter values derived from new PD signatures (e.g., further exemplars provided during the registration process and subsequently verified PD signatures) are used to update user shake characteristics data. At step 1801 required variables are initialized. Step 1802 calculates a number of direction reversals or curvature sign changes present in the PD signature curve (or trace). Step 1803 adds this value to a total and to a square of the sums value, and increments a counter representing the number of PD signatures contributing to the totals to be used in future calculations of an average shake value for those signatures.

Figure 19:
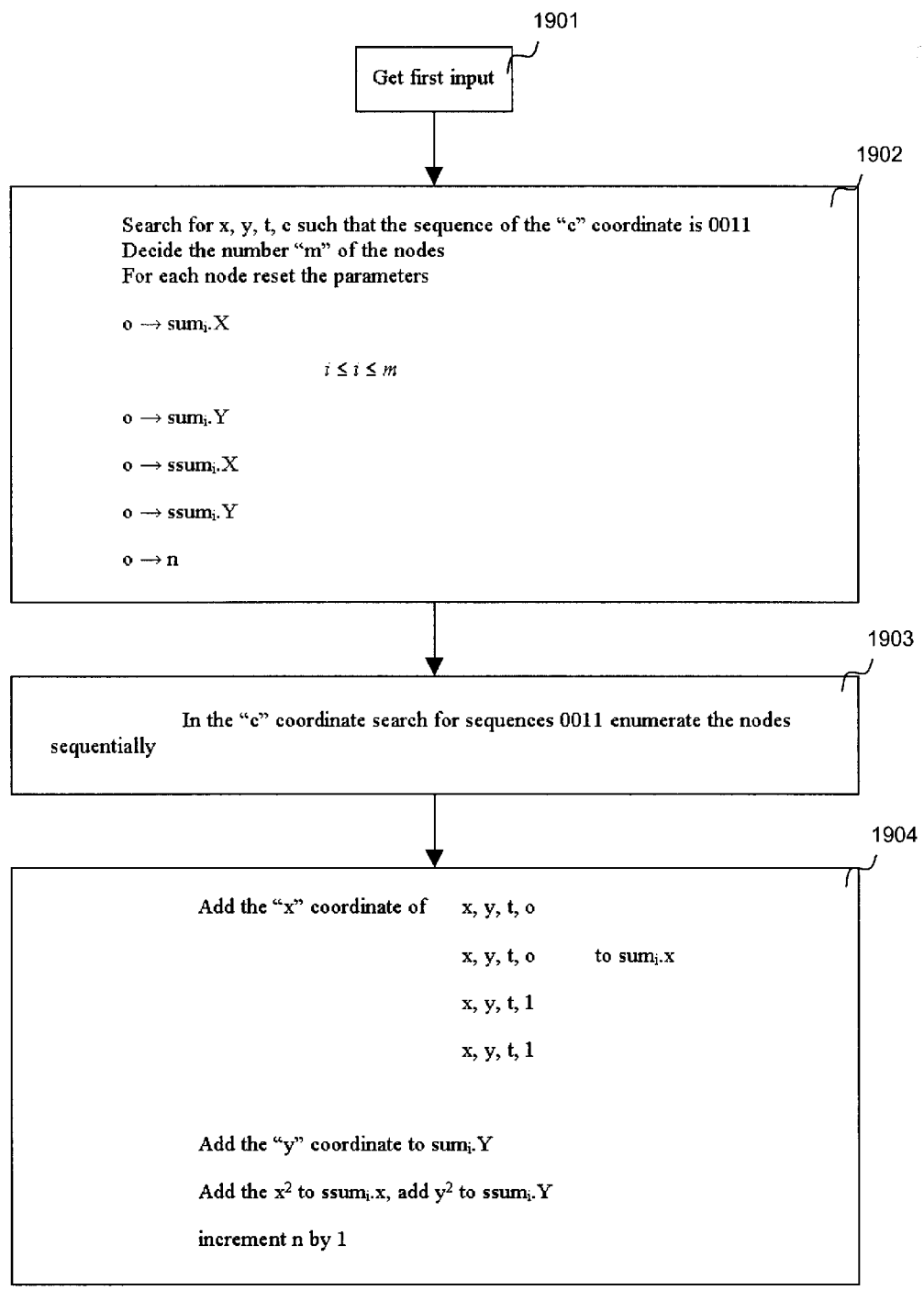
FIG. 19 is a flow chart of the steps involved in the click learning or updating analysis.

FIG. 19 is a flow diagram of a method of learning, i.e., updating, click analysis parameters. A first input is obtained at step 1901 and, at step 1902, a count is maintained for each agent or node of the number of clicks and the associated PD coordinates. Identification of clicks is enumerated at step 1903, and click parameter totals are updates at step 1904.

Figure 20:
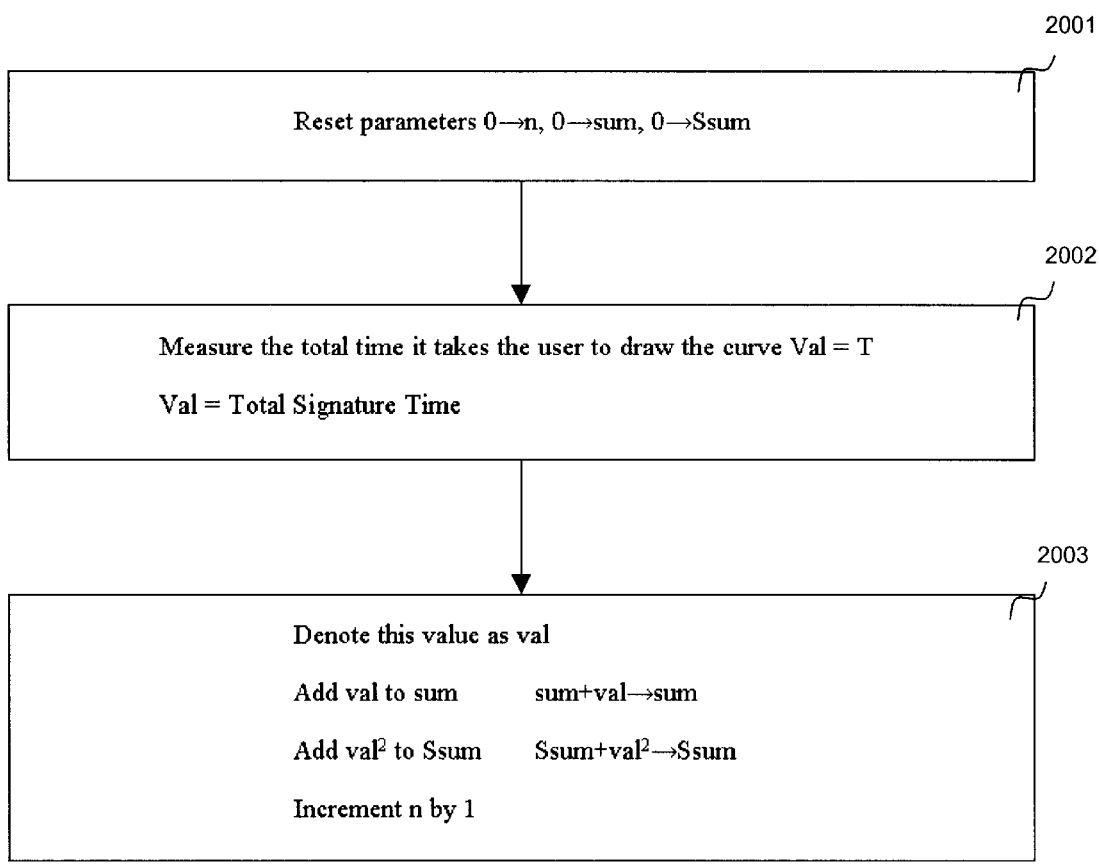
FIG. 20 is a flow chart of the steps involved in the time analysis learning process.

FIG. 20 is a flow chart of the time analysis learning which may be performed as part of the signature comparison. In step 2001 variables "n" and "Ssum" are initialized and, at step 2002 a calculation is performed to determine the total signature time. In step 2003 the accumulated values are updated.

Figure 21:
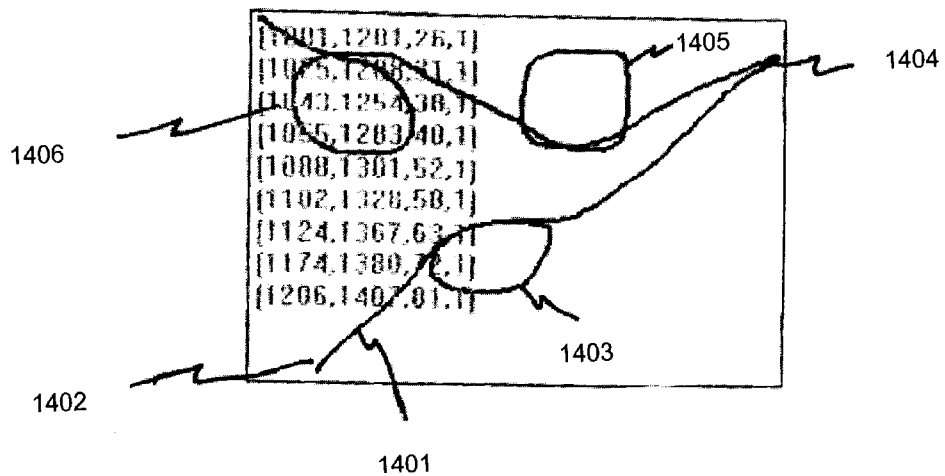
FIG. 21 is another example of a sampled mouse signature.

FIG. 21 is an example of a sampled PD signature. After a successful registration process where the system has a unique authenticated PD signature of a given user stored in the system security database, the system is ready for digital signature approvals. When a remote licensee site generates a request to authenticate and identify a remote user, the licensee site (e-commerce, e-banking, etc. web site) redirects a signature authentication request. The system generates and sends the user personal virtual pad to the remote PC asking the user to sign his own digital PD signature. The user signs and the sampled mouse signature is delivered for authentication online. After a few seconds the WSAS delivers the result: "Valid Signature" or "Invalid Signature" to the user and the licensee web site that originally generated the authentication request. The licensee site security policy may be used to generate the appropriate approval criteria.

As previously described, a preferred implementation of the Web Signature Recognition Engine is based on Fuzzy Cluster Means (FCM). The input of the FCM algorithm is a PD drawn curve or history trace. The cluster centers are initialized with values $Ck=(X_k, Y_k, A_k)$ where X, Y, A refer to X, Y planar coordinates and A refers to an arc length from the beginning of the curve, then the FCM algorithm minimizes a cost function of the centers position. Statistical relations between the centers $C_k$ are calculated after the centers converge. Any deviation in the final positions $(X_k, Y_k, A_k)$ after the convergence is achieved are measured and a statistical inference is drawn. Another choice for a recognition engine is based on a Wavelet Transform. The advantage of wavelet decomposition is enhanced compression and flexibility to the curve changes. In either case, if the comparison succeeds then the user will be given access to the required resource. The comparison process compares the path, speeds and locations on which the PD moves in the authenticated PD signature to the related data in the sampled PD signature. The comparison between the signature may include a neural network based algorithm. This comparison method gives a secure and natural way to authenticate the identity of a remote user via the Internet. This method can dramatically reduce forgery and will contribute to increase trust between consumers and e-Businesses Web Service Providers.

Figure 22:
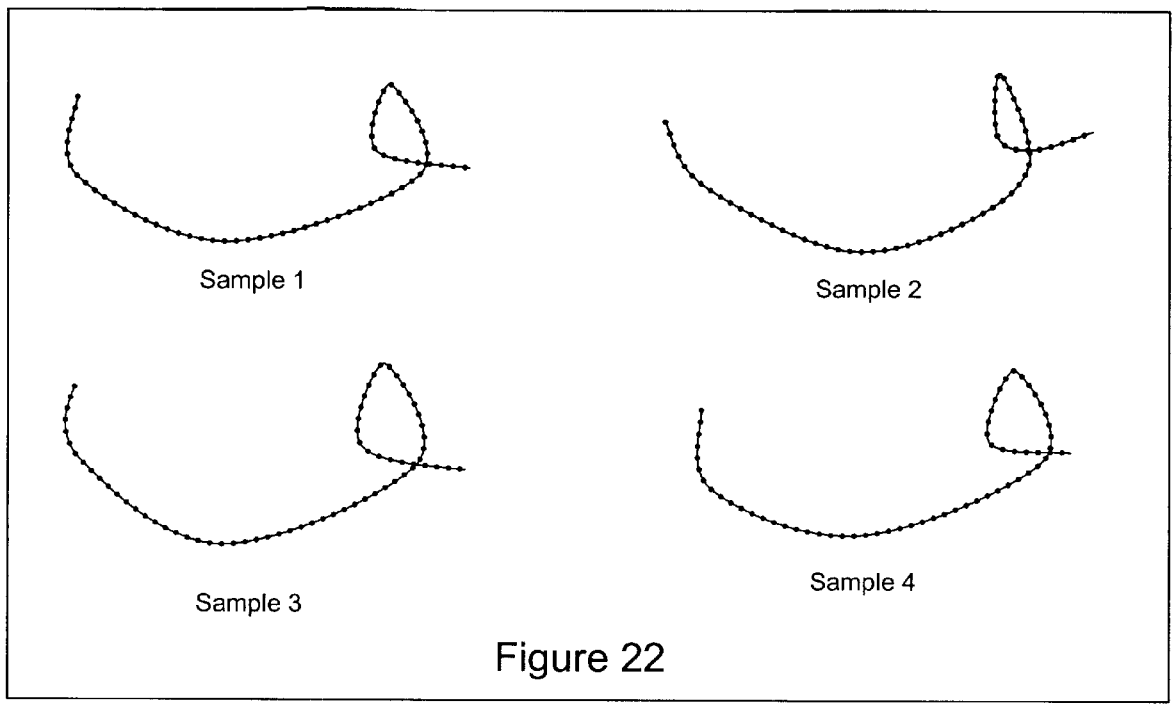
FIG. 22 is a set of diagrams of four sample signature (or portions of signatures) traces used to train a signature recognition system according to the invention.

Use of the FCM is further illustrated in FIG. 22 depicting a set of diagrams of four sample signature (or portions of signature) traces used to train the WSAS. Typically, a user would register with the system by providing identifying information and several exemplar or sample signatures, in the present example, samples 1–4. Each of the curves or history tracings made by the user is represented by a sequence of sampled values including the x,y coordinates of the PD (e.g., mouse) as represented in the figure by dots. Although evenly spaced in the figure, spacing of the samples along the curve or tracing is dependent upon the speed with which the PD traverses a given distance. Thus, rapid movement of a PD results in wide spacing between samples, while slow movement produces a cluster of samples as represented by the dots in the figure.

Once received, one of the samples is selected for analysis and will be used to calculate an initial position of nodes or agents for all subsequent PD signature analysis. In general, it has been found that, in a group of four such signatures, the third signature is the most representative of future attempts. This is due to user learning causing a peak in performance around attempt three, whereafter fatigue tends to degrade performance.

Figure 23:
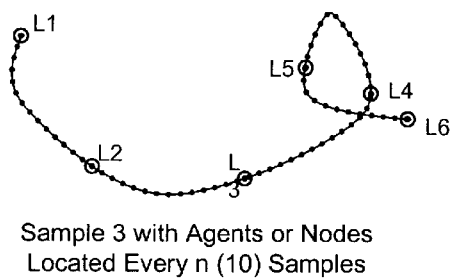
FIG. 23 is a diagram of a selected exemplar signature trace showing sample points constituting the signature and node or "agent" placement along the signature.
Figure 24:
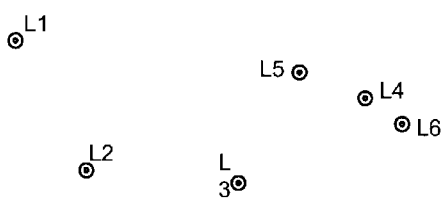
FIG. 24 is a diagram of the agents extracted from the exemplar signature of FIG. 23.

FIG. 23 is a diagram of a selected exemplar PD signature trace showing sample points constituting the signature and agent placement along the signature. Agents L1 through L6 are placed at specified distances along the signature trace. Since the density of samples (represented by dots in the figure) is dependent upon PD movement speed, the number of samples between agents may vary. Further, although a first agent L1 is shown at the beginning of the PD signature trace, it is preferable that it be instead placed back from the initial sample by, for example, a distance equal to ¼ to ½ the distance between agents. The initial agent locations resulting from such placement are shown in FIG. 24. FCM is then used to cause the agents to migrate to minimum cost or energy locations along (or nearby) the PD signature trace.

Figure 25:
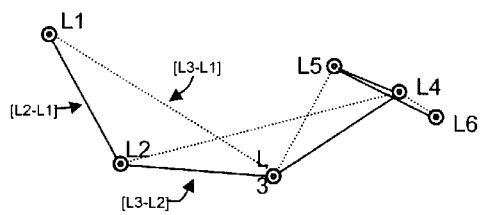
FIG. 25 is a diagram graphically depicting computation of a set of geometric vectors describing the geometry of the agents of FIG. 23.

FIG. 25 graphically depicts computation of a set of geometric vectors describing the geometry of the repositioned agents after FCM. That is, for n agents, n−2 values are computed representing geometric characteristic vectors for that signature. These values are then stored in a user authenticated PD signature profile. Each of the remaining three (or, the best two of the remaining three) sample PD signatures are similarly processed, each time the user authenticated signature profile being updated. The updating provides a statistical average (or other melding of data) of the geometric characteristic vectors describing the final agent locations stored as the user authenticated signature profile. This learning feature of updating the geometric characteristic vector, as previously described, allows the web signature authentication server to accommodate signature changes over time. Note that more sophisticated methods of updating the geometric characteristic vector may be employed so as to enhance system learning and adaptation.

Figure 26:
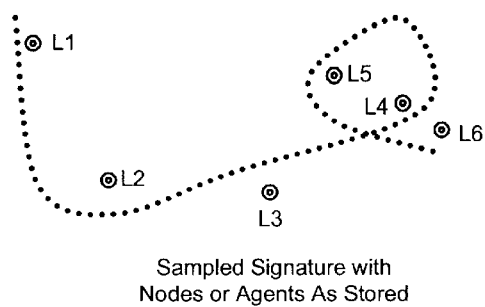
FIG. 26 is a diagram of a newly sampled PD signature trace together with agents positioned at initial starting locations derived from the sample signature as shown in FIG. 24.
Figure 27:
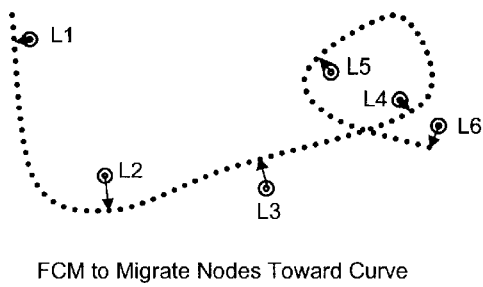
FIG. 27 is a diagram of agent movement toward the points constituting the sampled PD signature trace so as to minimize system cost or energy consistent with implementation of a fuzzy cluster means procedure.
Figure 28:
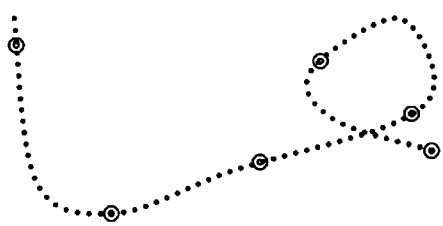
FIG. 28 is a diagram of agents migrating to final positions after application of a fuzzy cluster means procedure.

Validation of an unknown PD signature is described with reference to FIGS. 26–29. In FIG. 26 a newly sampled PD signature trace is shown together with agents positioned at initial starting locations derived from the stored exemplar PD signature. The initial locations were previously determined with reference to a first analyzed one of the sample signatures and are not normally updated absent a drastic change to the signature. As shown in FIG. 27, FCM causes agent movement toward the points constituting the sampled PD signature trace so as to minimize cost, i.e., system energy, consistent with implementation of the FCM procedure, the final positions of the agents shown in FIG. 28. While these agents lie on the sampled signature in FIG. 28, one of ordinary skill in the art would appreciate this may not always occur.

Figure 29:
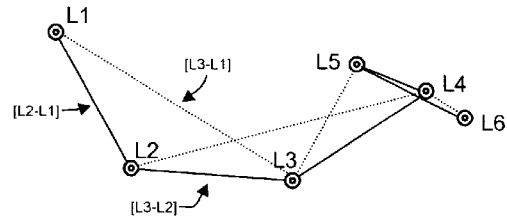
FIG. 29 is a diagram graphically depicting computation of one set of geometric vectors describing the geometry of the agents of FIG. 28.

FIG. 29 graphically depicts the computation of a set of geometric vectors based on these final agent locations. The geometric vectors representing the agent geometry of the newly sampled PD signature are compared with the stored geometric characteristic vector representative of the authenticated exemplar PD signature. A statistical match between the vectors results in authentication of the signature, verification of user identity, and (eventual) updating of the stored geometric characteristic vector to reflect the most recently verified PD signatures.

Figure 30:
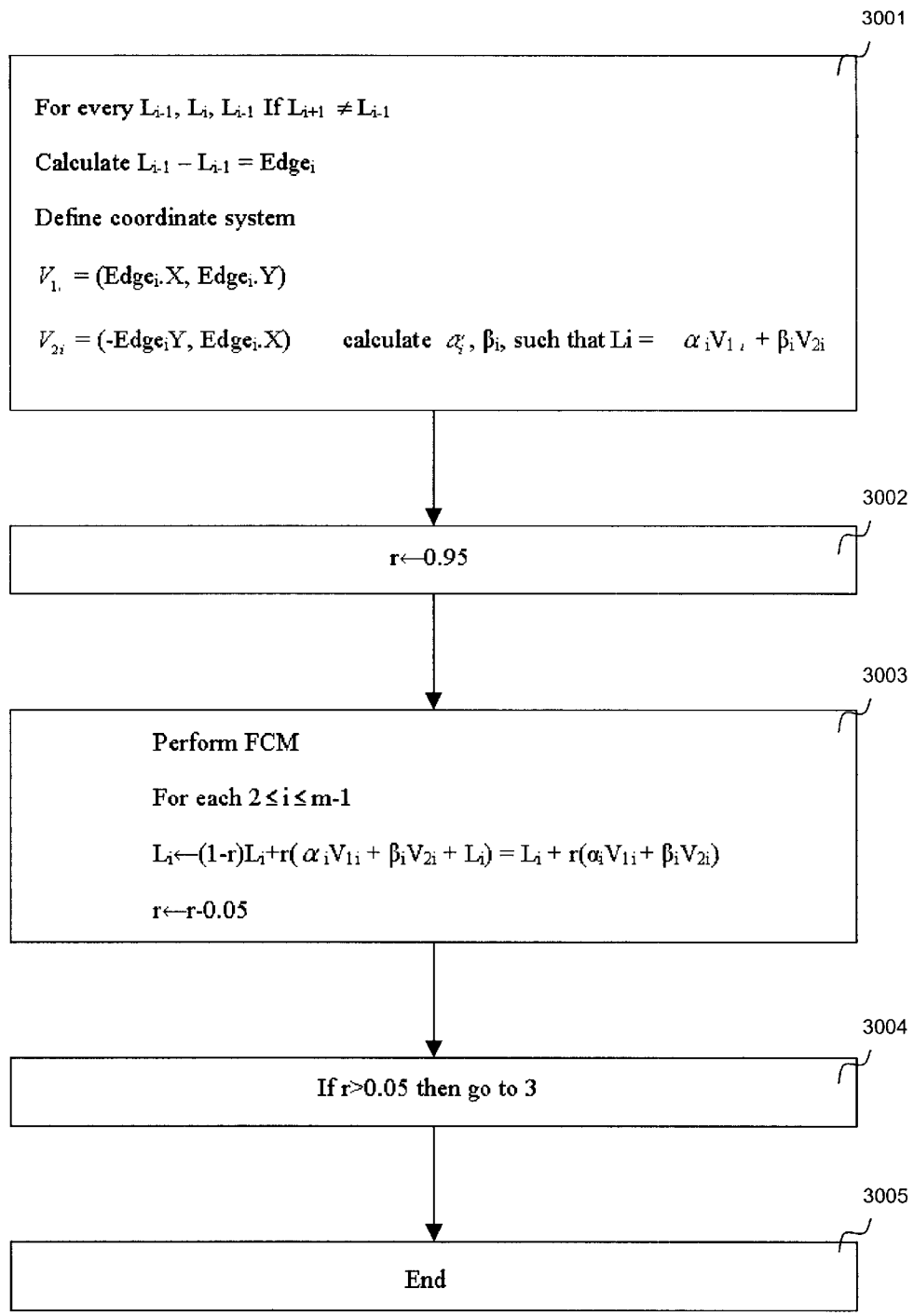
FIG. 30 is a flow diagram of the triangular process used in the current embodiment of the invention.

FIG. 30 is a flow diagram of the Adaptive Resonance Theory-Fuzzy Cluster Means (ART-FCM) Triangle form used in a preferred embodiment of the present invention. In step 3001 for every three nodes or agents ($L_{i-1}$, $L_i$, $L_{i+1}$) and edge is calculated and a coordinate system is defined and $\alpha$ and $\beta$ are calculated. In step 3002 "r" is defined to be 0.95. In step 3003 FCM is performed for a number of $L_i$s. Step 3004 is repeated while "r" is greater than 0.05.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

It should further be noted and understood that all publications, patents and patent applications mentioned in this specification are indicative of the level of skill of those skilled in the art to which the invention pertains. All publications, patents and patent applications are herein incorporated by reference to the same extent as if each individual publication patent or patent application was specifically and individually indicated to be incorporated by reference in its entirety.

What is claimed is:

1. A method of validating an identity of a user using a pointing device comprising the steps of:
   displaying a background image,
   positioning at least one object on said background image,
   operating said pointing device to provide data relative to said background image,
   sampling a plurality of events corresponding to positions of a cursor while performing said step of operating to provide a sampled pointing device (PD) signature including a set of position vectors,
   comparing said sampled PD signature to a stored PD signature representing the identity of the user, and
   validating said identity of said user in response to said comparing step.

2. The method of claim 1 wherein said step of operating includes moving said PD to manipulate a cursor on said background image.

3. The method of claim 2 wherein said step of operating said pointing device includes moving a mouse.

4. The method of claim 1 wherein said step of sampling a plurality of events includes clicking of said pointing device.

5. The method of claim 1 wherein said step of sampling a plurality of events includes a drag and drop event by said pointing device.

6. The method of claim 1 wherein said sampling a plurality of events includes sampling a time component.

7. The method of claim 1 wherein said step of comparing includes applying a set of agents to analyze said sample signature and determining if said sample signature satisfies a threshold matching criteria.

8. The method of claim 1 further comprising the steps of:
   receiving a plurality of signature exemplars; and
   creating a set of agents associated with said exemplars.

9. The method of claim 1 wherein said step of displaying said background image includes displaying a graphic.

10. The method of claim 1 wherein said step of operating said pointing device includes positioning said cursor relative to said objects.

11. The method of claim 1 wherein said step of operating said pointing device includes positioning a draggable icon on said background image.

12. The method of claim 1 wherein said step of sampling a plurality of events includes sampling horizontal and vertical positions of said cursor and a time parameter associated with respective ones of said events.

13. The method of claim 1 wherein said step of sampling a plurality of events includes sampling a mode of said input device.

14. The method of claim 13 wherein said step of sampling a mode of said input device includes a step of sampling a normal mode, a "drag and drop" mode, or a click mode of said input device.

15. The method of claim 1 wherein said step of processing said position vector to provide signature characteristics includes a step of processing a series of said events using a plurality of agents.

16. The method of claim 1 further comprising a step of:
   receiving a verification request from a provider; and
   issuing in response to said step of validating, an authorization message to said provider.

17. A software system stored on a computer readable medium for validating a user's identity comprising software configured to perform the steps of:
   displaying an object map to a user;
   receiving a signal from an input device manipulated by a user;
   sampling a plurality of events corresponding to positions of a cursor to provide a sampled signature including a set of position vectors;
   processing said position vectors to provide signature characteristics;
   comparing said signature characteristics to characteristics of a stored signature representing the user's identity;
   validating said user's identity in response to said comparing step.

18. The software system on a computer readable medium of claim 17 wherein said step of operating includes moving a PD to manipulate a cursor on said object map.

19. The software system on a computer readable medium of claim 18 wherein said step of operating said pointing device includes moving a mouse.

20. The software system on a computer readable medium of claim 17 wherein said step of sampling a plurality of events includes clicking of a pointing device.

21. The software system on a computer readable medium of claim 17 wherein said step of sampling a plurality of events includes a drag and drop event by a pointing device.

22. The software system on a computer readable medium of claim 17 wherein said sampling a plurality of events includes sampling a time component.

23. The software system on a computer readable medium of claim 17 wherein said step of comparing includes applying a set of agents to analyze said sample signature and determining if said sample signature satisfies a threshold matching criteria.

24. The software system on a computer readable medium of claim 17 further comprising the steps of:

receiving a plurality of signature exemplars; and creating a set of agents associated with said exemplars.

25. The software system on a computer readable medium of claim 17 wherein said step of displaying said object map includes displaying a graphic.

26. The software system on a computer readable medium of claim 17 wherein said step of operating a pointing device includes positioning said cursor relative to said objects.

27. The software system on a computer readable medium of claim 17 wherein said step of operating a pointing device includes positioning a draggable icon on said object map.

28. The software system on a computer readable medium of claim 17 wherein said step of sampling a plurality of events includes sampling horizontal and vertical positions of said cursor and a time parameter associated with respective ones of said events.

29. The software system on a computer readable medium of claim 17 wherein said step of sampling a plurality of events includes sampling a mode of said input device.

30. The software system on a computer readable medium of claim 29 wherein said step of sampling a mode of said input device includes a step of sampling a normal mode, a "drag and drop" mode, or a click mode of said input device.

31. The software system on a computer readable medium of claim 17 wherein said step of processing said position vector to provide signature characteristics includes a step of processing a series of said events using a plurality of agents.

32. The software system on a computer readable medium of claim 17 further comprising a step of:

receiving a verification request from a provider; and issuing in response to said step of validating, an authorization message to said provider.

33. A signature recognition system comprising:

a user computer system including a pointing device and a display screen, said user computer system operational to display a virtual pad on said display screen, respond to a positioning of said pointing device to position a cursor on said virtual pad, and provide a collection of vectors describing an operation of said pointing device with respect to said cursor; and a verification server in communication with said user computer system for receiving said collection of vectors, processing said vectors, comparing said processed vectors to exemplar signature data and, in response, providing signature recognition data.

34. The signature recognition system according to claim 33 further comprising a requester website server in communication with said user computer system and operational to redirect said user computer system to establish communications with said verification server in response to a user request.

35. The signature recognition system according to claim 34 wherein said user request comprises a request to obtain one of (i) a product, (ii) a service, (iii) access to services, (iv) access to information, and (v) a security verification.

36. The signature recognition system according to claim 33 wherein said pointing device comprises one of a (i) mouse, (ii) trackball, (iii) touchpad, (iv) graphics tablet, (v) joy stick, (vi) touch sensitive screen, (vii) light pen, and (viii) eye control input device.

37. The signature recognition system according to claim 33 wherein said virtual pad comprises a background image with at least one draggable icon positioned thereon.

38. The signature recognition system according to claim 33 wherein each of said collection of vectors includes (i) an ordered set of sampled pointing device position data; (ii) temporal data associated with said ordered set of sampled pointing device position data; and (iii) pointing device mode data.

39. The signature recognition system according to claim 33 further comprising an internet connected to said user computer system and to said verification server for providing communications therebetween.

40. The signature recognition system according to claim 33 wherein said user computer system is further operational to form a one-way hash of said collection of vectors to provide a trailer associated therewith to said verification server.

41. The signature recognition system according to claim 40 wherein said user computer system is further operational to encrypt and form a hash digest of said collection of vectors and said trailer to form an encrypted message and to send said encrypted message to said verification server.

42. The signature recognition system according to claim 33 wherein said verification server is operational to perform said processing of said collection of vectors by:

(i) locating a plurality of agents in a space associated with said collection of vectors;

(ii) executing a minimum cost routine to reposition said agents in said space to a characteristic set of positions relative to said collection of vectors; and (iii) formulating a description of a geometry of said characteristic set of positions to provide a signature characteristic record.

43. The signature recognition system according to claim 42 wherein said minimum cost routine comprises an Adaptive Resonance Theory-Fuzzy Cluster Means procedure.

44. The signature recognition system according to claim 33 wherein said verification server includes a memory storing a user record including said exemplar signature data, said exemplar signature data including a description of a geometry of a characteristic set of positions associated with a previously received sampled signature.

45. The signature recognition system according to claim 44 wherein said user record includes and identity of said user and said user record, including said identify of said user, is encrypted.

46. The signature recognition system according to claim 33 wherein said verification server is further operational to periodically update said exemplar signature data based on verified ones of said processed vectors.

47. The signature recognition system according to claim 33 wherein said processing said vectors by said verification server includes extracting (i) pointing device sampled signature trace data and (ii) user biometrics data.

48. The signature recognition system according to claim 47 wherein:

said pointing device sampled signature trace data includes information describing a path of said cursor relative to said virtual pad; and said biometrics data includes one of (i) pointing device kinetics information, (ii) user click duration information, and (iii) an input from a biometrics sensor device.

\* \* \* \* \*